(12) United States Patent
Torkian et al.

(10) Patent No.: US 9,443,229 B2
(45) Date of Patent: *Sep. 13, 2016

(54) SUPPLY CHAIN MESSAGE MANAGEMENT AND SHIPMENT CONSTRAINT OPTIMIZATION

(71) Applicant: Elemica, Inc., Wayne, PA (US)

(72) Inventors: Behzad Torkian, Atlanta, GA (US); Armand Castro, III, Atlanta, GA (US); Cindi Hane, Atlanta, GA (US); Nathan Blomquist, Atlanta, GA (US); Paul Dale, Frankfurt (DE); Maarten Koopmans, Frankfurt (DE); Blake Schnorf, Atlanta, GA (US); Markus Fix, Frankfurt (DE); Arun Samuga, Atlanta, GA (US)

(73) Assignee: Elemica, Inc., Wayne, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/980,679

(22) Filed: Dec. 28, 2015

(65) Prior Publication Data

US 2016/0162838 A1 Jun. 9, 2016

Related U.S. Application Data

(63) Continuation-in-part of application No. 14/558,285, filed on Dec. 2, 2014, now Pat. No. 9,224,135, which (Continued)

(51) Int. Cl.
*H04L 29/06* (2006.01)
*G06Q 10/10* (2012.01)
(Continued)

(52) U.S. Cl.
CPC ............ *G06Q 10/107* (2013.01); *G06Q 40/04* (2013.01); *G06Q 50/28* (2013.01); *H04L 9/3215* (2013.01);
(Continued)

(58) Field of Classification Search
CPC . H04L 9/3263; H04L 63/0823; H04L 51/04; H04L 63/08; H04L 9/3215; H04L 2463/082
USPC .......................................................... 726/22
See application file for complete search history.

(56) References Cited

U.S. PATENT DOCUMENTS 5,202,977 A 4/1993 Pasetes, Jr. et al.
6,606,529 B1 * 8/2003 Crowder et al. .............. 700/100
(Continued)

FOREIGN PATENT DOCUMENTS

JP 2005-146755 A 6/2005
JP 2009-005256 A 1/2009
(Continued)

OTHER PUBLICATIONS

Shim el al.,"Automatic Generation and Integration of RosettaNet Based on Generic Templates and Components". Proceedings of the 4th IEEE Int'l Workshop on Advanced Issues of E-Commerce and Web-Based Information Systems (WECWIS 2002) 1530-1354/02 2002 IEEE, pp. 1-8.*

(Continued)

*Primary Examiner* — Harunur Rashid
(74) *Attorney, Agent, or Firm* — Panitch Schwarze Belisario & Nadel LLP

(57) ABSTRACT

A method of adapting a message translation system includes receiving a message from a sender; selecting a configuration set from a stored plurality of configuration sets based on at least two of: information regarding the sender of the message, information regarding a recipient of the message, and information regarding the message type; processing the message in accordance with information derived from the selected configuration set; identifying an issue with the processing of the message in accordance with information derived from the selected configuration set; determining a resolution for the identified issue with the processing of the message in accordance with information derived from the selected configuration set; updating the selected configuration set based upon the determined resolution; reprocessing the message in accordance with information derived from the updated configuration set; and transmitting the message reprocessed in accordance with information derived from the updated configuration set to a recipient.

14 Claims, 15 Drawing Sheets

Related U.S. Application Data is a continuation-in-part of application No. 14/043,076, filed on Oct. 1, 2013, now Pat. No. 8,904,528.

(60) Provisional application No. 61/808,430, filed on Apr. 4, 2013, provisional application No. 61/792,388, filed on Mar. 15, 2013.

(51) Int. Cl.
*G06Q 50/28* (2012.01)
*H04L 29/08* (2006.01)
*H04L 12/58* (2006.01)
*G06Q 40/04* (2012.01)
*H04L 9/32* (2006.01)

(52) U.S. Cl.
CPC ........... *H04L 9/3263* (2013.01); *H04L 51/066* (2013.01); *H04L 67/12* (2013.01); *H04L 63/0823* (2013.01); *H04L 2463/082* (2013.01)

(56) References Cited

U.S. PATENT DOCUMENTS

| | | |
|---|---|---|
| 6,726,094 B1 | 4/2004 | Rantze et al. |
| 7,058,587 B1* | 6/2006 | Horne .......................... 705/7.22 |
| 7,085,286 B2 | 8/2006 | Dias et al. |
| 7,117,215 B1 | 10/2006 | Kanchwalla et al. |
| 7,337,148 B2 | 2/2008 | Xie et al. |
| 7,509,431 B2 | 3/2009 | Singhal et al. |
| 7,548,939 B2 | 6/2009 | Kalach et al. |
| 7,562,041 B2 | 7/2009 | Chehade et al. |
| 7,639,629 B2 | 12/2009 | Kumar et al. |
| 7,779,295 B1 | 8/2010 | Shah et al. |
| 7,836,120 B2 | 11/2010 | Zafar |
| 7,925,631 B1 | 4/2011 | Thillai et al. |
| 8,032,552 B2 | 10/2011 | Davies et al. |
| 8,046,441 B2 | 10/2011 | Banerji et al. |
| 8,065,657 B2 | 11/2011 | Deimel et al. |
| 8,145,992 B2 | 3/2012 | Jacquin et al. |
| 8,290,833 B2 | 10/2012 | Yang et al. |
| 8,312,148 B2 | 11/2012 | Anthias et al. |
| 8,688,975 B2 | 4/2014 | Hamilton, II et al. |
| 8,800,020 B1 | 8/2014 | Dale et al. |
| 8,904,528 B2 | 12/2014 | Dale et al. |
| 2002/0107699 A1 | 8/2002 | Rivera et al. |
| 2002/0107913 A1 | 8/2002 | Rivera et al. |
| 2002/0161688 A1 | 10/2002 | Stewart et al. |
| 2003/0002526 A1 | 1/2003 | Dias et al. |
| 2003/0065623 A1 | 4/2003 | Corneil et al. |
| 2003/0130945 A1 | 7/2003 | Force et al. |
| 2004/0010714 A1 | 1/2004 | Stewart |
| 2004/0030428 A1* | 2/2004 | Crampton et al. ............ 700/101 |
| 2004/0153359 A1 | 8/2004 | Ho et al. |
| 2004/0221045 A1 | 11/2004 | Joosten et al. |
| 2005/0071283 A1 | 3/2005 | Randle et al. |
| 2005/0171825 A1* | 8/2005 | Denton et al. .................... 705/8 |
| 2006/0059565 A1 | 3/2006 | Green et al. |
| 2006/0155946 A1 | 7/2006 | Ji |
| 2007/0143665 A1 | 6/2007 | Machiraju et al. |
| 2008/0120129 A1 | 5/2008 | Seubert et al. |
| 2008/0120600 A1 | 5/2008 | Deimel et al. |
| 2008/0244088 A1 | 10/2008 | Shorter et al. |
| 2009/0282242 A1 | 11/2009 | Lortz |
| 2009/0328153 A1 | 12/2009 | Chetuparambil et al. |
| 2010/0211938 A1 | 8/2010 | Singh et al. |
| 2010/0269156 A1 | 10/2010 | Hohlfeld et al. |
| 2012/0158875 A1 | 6/2012 | Almeida |
| 2012/0233023 A1 | 9/2012 | Chehade et al. |
| 2013/0031361 A1 | 1/2013 | Fahn et al. |
| 2013/0080542 A1 | 3/2013 | Peng et al. |
| 2013/0226776 A1 | 8/2013 | Chehade et al. |
| 2013/0283106 A1 | 10/2013 | King et al. |
| 2014/0068252 A1 | 3/2014 | Maruti et al. |
| 2014/0114825 A1 | 4/2014 | Krikorian et al. |

FOREIGN PATENT DOCUMENTS

| | | |
|---|---|---|
| WO | 9838585 A1 | 9/1998 |
| WO | 2004072886 A1 | 8/2004 |
| WO | 2006026659 A2 | 3/2006 |

OTHER PUBLICATIONS

IBM, "B2B Integration special features," posted on the Internet at http://www-01ibm.com/software/in/commerce/b2b/b2b-integration/products/special-features/ (visited Jul. 2013).

IBM Redbooks, "Tracking Payments and Securities with IBM Financial Transaction Manager V2," posted on the Internet at http://www.redbooks.ibm.com/abstracts/tips0963.html (visited Jul. 2013).

Trappey et al, "Building b2b protocols in inter-enterprise process execution," Proceedings of the Fifth Asia Pacific Industrial Engineering and Management Systems Conference, posted on the internet at http://www.apiems.net/archive/apiems2004/pdf/apiems2004_73.pdf (2004).

The Oracle Corp., The Java EE 6 Tutorial, vol. 1 (2010).

BEA Systems, "Introducing WebLogic Integration B2B Security," found on the Internet at http://docs.oracle.com/cd/E13214_01/wli/docs70/b2secur/intro.htm (visited Jul. 2013).

RSSBus, "As2 Connector—Getting Started," found on the internet at http://www.rssbus.com/solutions/as2/gettingstarted.aspx (2013).

ACM Digital Library, "Client certificate and IP address based multi-factor authentication for J2EE web applications," Abstract only, found on the Internet at http://dl.acm.org/citation.cfm?id=1321229 (2007).

Williscroft, "Trading Partner Web Certificates," found on the internet at http://www.imc.org/ieff-pkix/old-archive-00/msg01245.html, (Jun. 23, 2000).

Office Action issued Dec. 31, 2013 in U.S. Appl. No. 14/043,076 by Dale.

Office Action issued May 5, 2014 in U.S. Appl. No. 14/043,076 by Dale.

Office Action issued Apr. 22, 2014 in U.S. Appl. No. 14/181,139 by Dale.

Int'l Search Report and Written Opinion issued Oct. 17, 2014 in Int'l Application No. PCT/US2014/028904.

Int'l Preliminary Report on Patentability issued Feb. 19, 2015 in Int'l Application No. PCT/US2014/028904.

U.S. Appl. No. 14/043,076 by Dale, filed Oct. 1, 2013.

Office Action issued Jul. 21, 2014 in U.S. Appl. No. 14/043,076 by Dale.

Shim et al.,"Automatic Generation and Integration of RosettaNet Based on Generic Templates and Components". Proceedings of the 4th IEEE Int'l Workshop on Advanced Issues of E-Commerce and Web-Based Information Systems WECWIS 2002) 1530-1354/02 2002 IEEE, pp. 1-8.

Office Action issued Jul. 6, 2015 in U.S. Appl. No. 14/558,285 by Dale.

U.S. Appl. No. 14/181,139 by Dale, filed Feb. 14, 2014.

U.S. Appl. No. 14/558,285 by Dale, filed Dec. 2, 2014.

Office Action issued Mar. 8, 2016 in JP Application No. 2016-502932.

Koga et al., "A Report on the 3rd Annual PKI R&D Workshop," IPSJ SIG Technical Report pp. 159-163 (2004).

\* cited by examiner

| 1105 | Time | 7a | 8a | 9a | 10a | 11a | 12p | 1p | 2p | 3p | ... |
|---|---|---|---|---|---|---|---|---|---|---|---|
| 1110 | Loading Point Reservation Mask | 0 | 0 | 1 | 1 | 1 | 1 | 0 | 1 | 0 | ... |
| 1120 | Staffing Mask | 0 | 1 | 1 | 1 | 0 | 0 | 1 | 1 | 1 | ... |
| 1130 | Outage Mask | 1 | 1 | 1 | 1 | 1 | 1 | 0 | 1 | 1 | ... |
| 1190 | Loading Point Viable Times | 0 | 0 | 1 | 1 | 0 | 0 | 0 | 1 | 0 | ... |

FIG. 11

| 1305 | Time | 7a | 8a | 9a | 10a | 11a | 12p | 1p | 2p | 3p | ... |
|---|---|---|---|---|---|---|---|---|---|---|---|
| 1310 | Staff 1 Mask | 0 | 1 | 1 | 1 | 0 | 1 | 1 | 1 | 1 | ... |
| 1320 | Staff 2 Mask | 0 | 1 | 1 | 1 | 0 | 0 | 1 | 1 | 1 | ... |
| 1330 | Staff 3 Mask | 0 | 0 | 1 | 1 | 1 | 0 | 1 | 1 | 1 | ... |
| 1390 | Overall Staffing Mask | 0 | 1 | 1 | 1 | 0 | 0 | 1 | 1 | 1 | ... |

FIG. 13

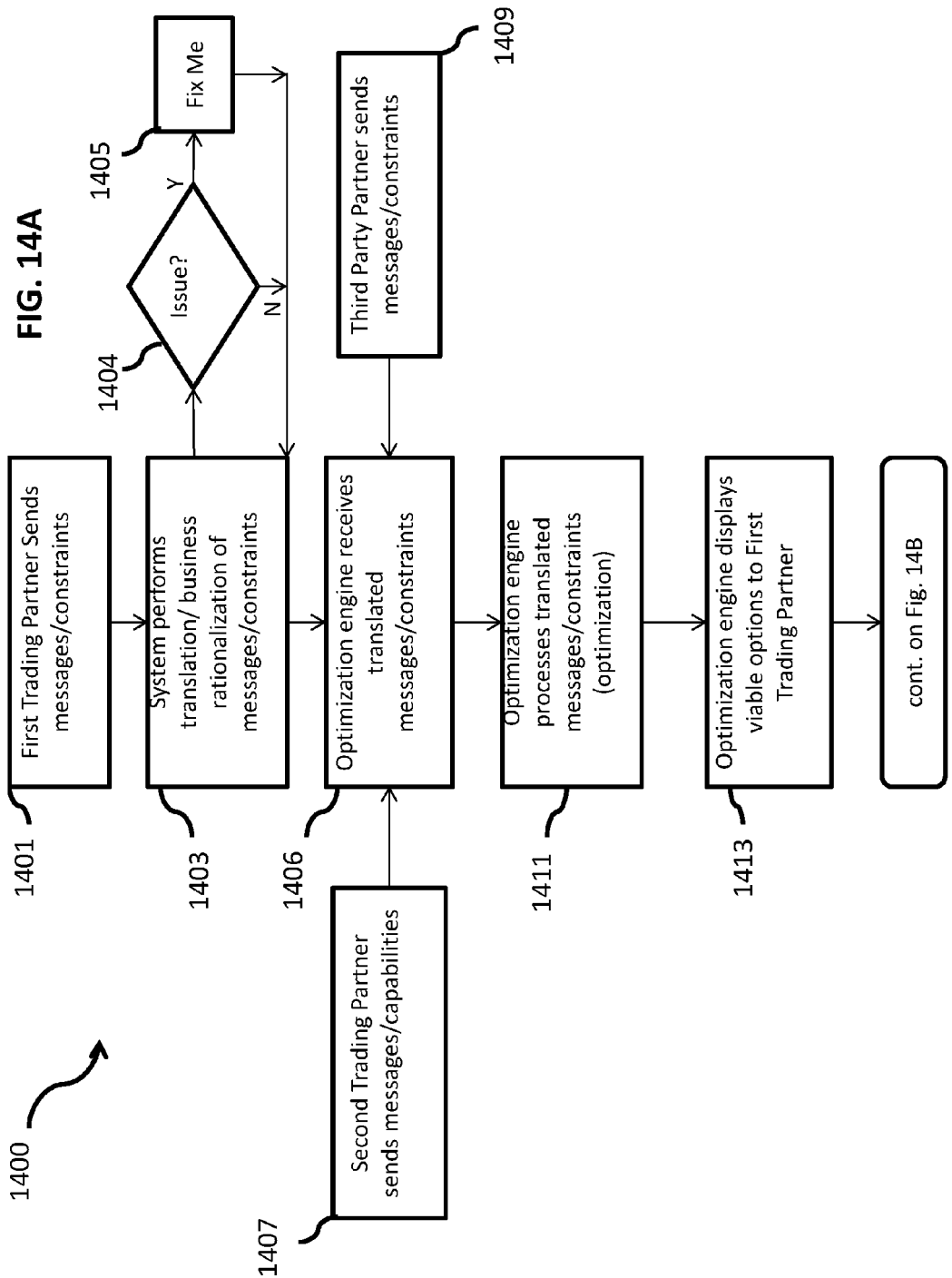

SUPPLY CHAIN MESSAGE MANAGEMENT AND SHIPMENT CONSTRAINT OPTIMIZATION

CROSS-REFERENCE TO RELATED APPLICATION

This application is a Continuation-in-Part of U.S. patent application Ser. No. 14/558,285, filed Dec. 2, 2014, now U.S. Pat. No. 9,224,135, which is a Continuation-in-Part of U.S. patent application Ser. No. 14/043,076, filed Oct. 1, 2013, now U.S. Pat. No. 8,904,528 and claims the benefit under 35 U.S.C. §119(e) of U.S. Provisional Application No. 61/808,430, filed Apr. 4, 2013 and U.S. Provisional Application No. 61/792,388, filed Mar. 15, 2013, the entire disclosures of which are incorporated herein by reference.

BACKGROUND OF THE INVENTION

The present invention relates generally to systems and methods for translation of messages and optimization of shipping goods between trading partners in the trading network. The preferred invention also relates to a system for message management of messages between trading partners in a supply chain and optimization of the transportation or transportation scheduling of goods traded between the trading partners prompted by the messages.

Supply chains involve large numbers of parties, each of whom generally need to communicate with multiple other parties or trading partners. There are often multiple messages required with several trading partners to effect a single transaction. Numerous message exchange standards exist to facilitate these supply chain communications, but only certain standards are supported by the business systems of each party. Mismatches in supported standards may make communications more costly, less efficient, less accurate, or even lead to an inability to conduct business between the parties.

Scheduling shipments in the supply chain to transport goods between sellers and buyers or nearly any trading partner is a complicated process. Several third party carriers may be employed to transport goods from the seller or manufacturer to the buyer, including air carriers, ground carriers, ocean carriers, or various combinations of these carriers. In addition, further variables must be managed including time slots, product quantities, product volumes, special shipping requirements such as refrigeration, fragile item handling, storage, labor outages, and numerous other shipping constraints. These multiple variables and/or constraints in a supply chain often create significant uncertainty and planning complications for supply chain participants. These complications and a plurality of messages may be initiated by a single request from a trading partner requesting goods from another trading partner. A preferred supply chain management system is able to process or translate messages between the multiple trading partners involved in these transactions. The trading partners often provide messages in different formats and the preferred system is able to optimize or provide several optimum possibilities for transporting the requested goods from the manufacturer or distributor to the requesting trading partner, as well as translate the formats or languages preferred by each trading partner.

Supply chain management was traditionally governed exclusively by manual techniques and only recently has been partially automated management systems such that sellers, buyers, manufacturers, carriers and other supply chain participants could potentially connect to a central server to submit capabilities to the central server. The central server may provide solutions to supply chain participants or trading partners for shipping goods through feasibility techniques based on participant constraint inputs. These solutions are often difficult to process due to the large number of variables in even a simple supply chain event and because of the multitude of message formats or languages of the trading partners. Traditional supply chain optimization techniques used in this environment are often limited and time consuming, in that they sequentially check constraints to eliminate unworkable solutions. Even on modern high-speed computer systems, the number and nature of constraints can make determination of available options using traditional algorithms impractical. In addition, communicating the available options and understanding the requests to and from different trading partners is also challenging. A traditionally solved supply chain management event often has so many constraints, involves multiple trading partners and is so complicated that modern high-speed computer systems require numerous hours to provide practical shipping solutions to schedule shipment of materials from a manufacturer trading partner to a consumer trading partner and to communicate these results to the appropriate trading partners.

It would be desirable to design and implement a system and method for managing a supply chain that accurately translates messages, improves the operation of the computer systems and provides prompt solutions to supply chain scheduling with constraints and variables including time, carrier preferences, special goods and similar variables and constraints. The improved system and associated methods preferably, efficiently and accurately transmit messages between trading partners in the trading network without requiring modification to the systems or message exchange formats of the parties.

BRIEF SUMMARY OF THE INVENTION

Briefly stated, the preferred present invention is directed to a system and method for controlling access to resources and facilitating correction of access issues. A two-factor authentication method comprises: receiving a credential associated with a connection request, determining a resource identifier associated with the connection request, identifying a user associated with the resource identifier, determining whether the received credential is valid for the identified user, and, responsive to a determination that the credential is not valid for that user, denying access to resources associated with the resource identifier and communicating information regarding the failure to the identified user.

In another aspect, the preferred present invention is directed to a method of adapting a message translation system including receiving a message from a sender; selecting a configuration set from a stored plurality of configuration sets based on at least two of: information regarding the sender of the message, information regarding a recipient of the message, and information regarding the message type; processing the message in accordance with information derived from the selected configuration set; identifying an issue with the processing of the message in accordance with the information derived from the selected configuration set; determining a resolution for the identified issue with the processing of the message in accordance with information derived from the selected configuration set; updating the selected configuration set based upon the determined resolution; reprocessing the message in accordance with information derived from the updated configuration set; and transmitting the message reprocessed in accordance with information derived from the updated configuration set to a recipient.

In a further aspect, a preferred embodiment of the present invention is directed to a method of adapting a message translation system including processing a set of messages associated the selected configuration set in accordance with information derived from the updated configuration set; comparing output of processing the set of messages associated with the selected configuration set in accordance with information derived from the updated configuration set with predetermined reference output associated with the set of messages; and responsive to a determination that the output of processing the set of messages and the predetermined reference output match, replacing the selected configuration set with the updated configuration set.

In yet a further aspect, a preferred embodiment of the present invention is directed to a method for improved efficiency of a computing system for resource scheduling optimization including receiving, by a computing system of the message translation system, a business message including respective constraints on a plurality of resources, wherein the plurality of constraints includes a plurality of temporal constraints and a plurality of qualitative constraints; processing the plurality of constraints, by a processor of a message translation system, into a format for use with the computing system; expanding a first qualitative constraint of the plurality of qualitative constraints into an expanded temporal constraint on a first resource of the plurality of resources meeting one or more quality levels associated with the plurality of qualitative constraints; translating, by the computing system, the plurality of temporal constraints and the expanded temporal constraint into respective sets of binary temporal constraints; combining, by the computing system, each of the respective sets of the binary temporal constraints into combined respective binary temporal constraints, wherein combining the respective sets of binary temporal constraints into combined respective binary temporal constraints includes applying one or more bit-wise Boolean operations to the respective sets of binary temporal constraints; combining, by the computing system, the combined respective binary temporal constraints into a single overall binary temporal schedule, wherein combining the combined respective binary temporal constraints includes applying one or more bit-wise Boolean operations to the combined respective binary temporal constraints; translating, by the computing system, the single overall binary temporal schedule into a non-binary temporal schedule; and displaying to a user, one or more viable scheduling alternatives from the non-binary temporal schedule.

One or more steps of the above described aspect may be repeated in a subsequent run. Further, a subsequent run may be performed without knowledge of the previous run.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

FIG. 11 is an illustration of the process of determining the availability mask for a top-level resource in the s supply chain system of FIG. 1;

FIG. 13 is an illustration of the calculation of a mask of timeslot availability based upon staff availability in the supply chain system of FIG. 1; and FIGS. 14A and 14B illustrate a flow chart of an exemplary process for improved efficiency of translation of a business message through a message translation system in the supply chain system of FIG. 1.

DETAILED DESCRIPTION OF THE INVENTION

Figure 1:
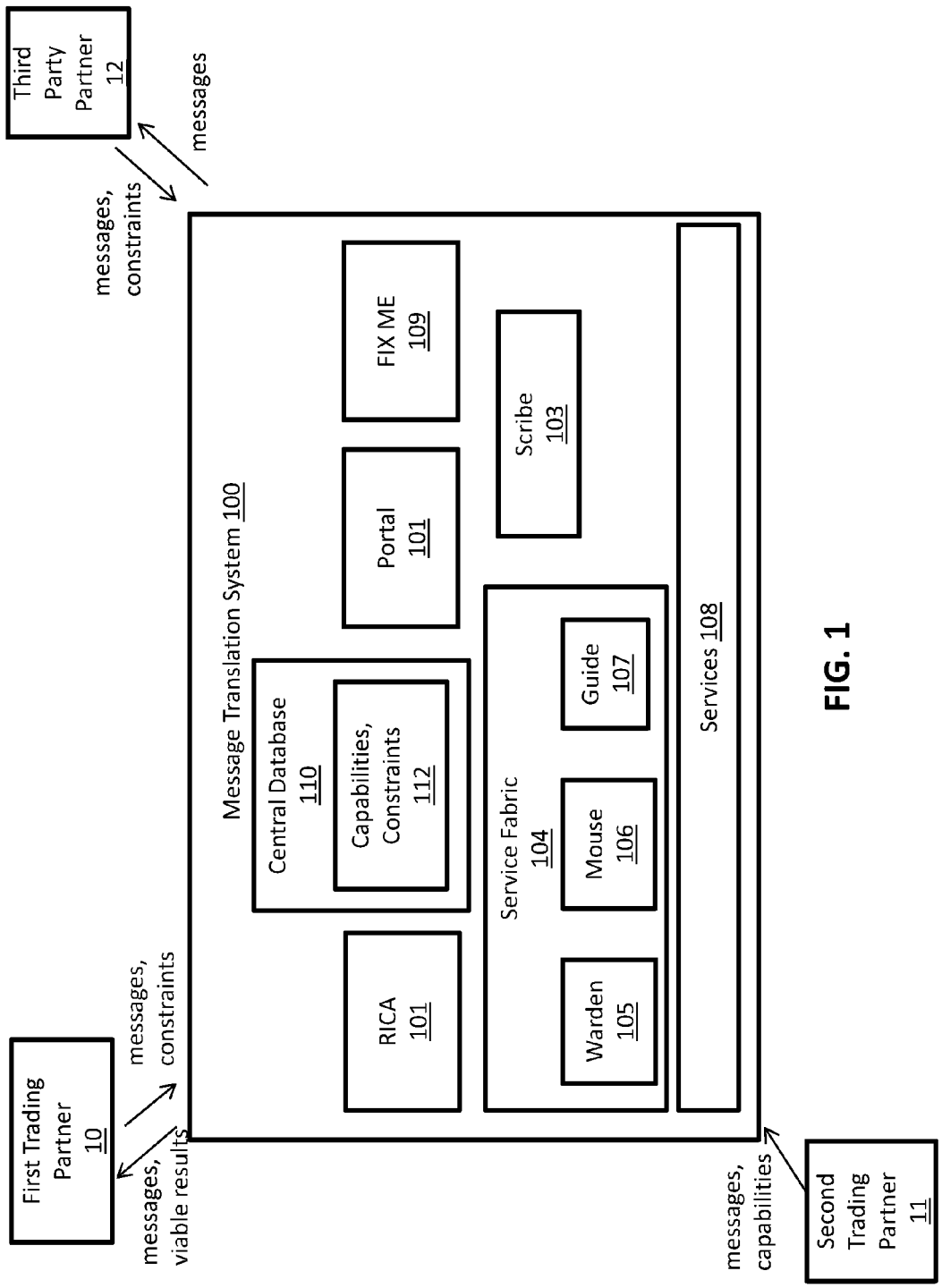
FIG. 1 is an exemplary diagram of a supply chain system that includes message translation and optimization systems for the supply chain in accordance with a preferred embodiment of the present invention.

Certain terminology is used in the following description for convenience only and is not limiting. The words "lower," "bottom," "top" and "upper" designate directions in the drawings to which reference is made. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, tolerances, etc.), would not vary the least significant digit.

Referring to the drawings in detail, wherein like reference numerals indicate like elements throughout, a preferred supply chain or message translation system 100 that includes message translation and optimization systems for the supply chain for transmitting messages between trading partners is described.

Referring to FIG. 1, the preferred supply chain system 100 provides for communications between trading partners 10, 11, 12. The trading partners 10, 11, 12 may communication with the system 100 through communications-specific software or message-handling components of other business systems, such as Enterprise Resource Planning (ERP) systems. The supply chain 100 provides, for example, translation of messages from the message exchange format used by a first trading partner 10 to and from the message exchange format used by a second trading partner 11.

The supply chain system 100 includes an interconnection component, Redundant Interchangeable Connectivity Array (RICA) 101, a user management interface, Portal 102, a data storage and management component, Scribe 103, a message processing system, Service Fabric 104, a central database 110 and an exception handling component, FIXME 109. The Portal 102 preferably includes a management interface for interacting with users at remote locations. RICA 101 provides the interconnection(s) between the network partners and the network for incoming and outgoing data. The Scribe 103 is the data storage and management system. The Service Fabric 104 is preferably configured through the Portal 102, gets input from RICA 101, and uses Scribe 103 for data retrieval and storage. The lower levels of the system 100 are created by the Service Fabric 104 and Scribe 103, integrated by RICA 101, and viewed and configured by the Portal 102. The central database 110 preferably handles optimization tasks and stores capabilities and constraints of the various trading partners 10, 11, 12 in a capabilities, constraints database 112. Together, the components create a generalized Process-Semantics-Aware High-Performance data store.

Messages may be any data or information stream related to a process, preferably a business process. The translated messages are generally business messages, for instance, purchase orders, acknowledgments, advance shipping notices, delivery receipts, invoices, or any other messages related to the buying, selling, manufacture, distribution, maintenance, and repair of goods, as well as other operations. In a preferred embodiment, types of messages may include, but are not limited to: Application Advice, Booking Confirmation, Booking Response, Booking Request, Certificate of Analysis, Custom Document, Delivery Receipt, Demand Forecast, Email Outbound, Envelope, Financial Information Report, Forecast, Freight Bill, General Purpose, Goods Receipt, Inventory, Inventory Actual Usage, Invoice, Invoice Adjustment, Load Tender Motor, Load Tender Ocean, Load Tender Response, Lockbox, Ocean Schedule, Order Change, Order Create, Order Response, Organization Relationships, Ownership Transfer Report, Payment Details, Planning Schedule, Product Activity Report, Product Data Message, Product Movement Report, Receipt Notice, Receiving Advice, Self Invoice, Ship Notice, Shipment Information, Shipment Instructions, Shipment Status, Shipping Schedule, and Supply Plan.

Messages are generally received in one of many message exchange formats and translated to another message exchange format selected based upon the capabilities of the receiver. Message formats may include, for example, UN/EDIFACT, ANSI X12, CIDX, PIDX, IDOC, xCBL, EBXML, cXML, GUSI, ODETTE, OAGIS, or other XML formats. Messages may be transmitted to and from the message translation system 100 using a variety of methods such as email, FTP/SFTP, HTTP/HTTPS, SOAP, REST, or an API. Messages may be transmitted completely asynchronously, or a requestor may synchronously wait for a reply, which is created within Service Fabric 104. Other methods for transmitting messages over a network are known to those skilled in the art, and are within the scope of this disclosure.

RICA 101 is a self-service, content-agnostic, multi-protocol messaging broker. RICA 101 decouples the incoming message processing from the protocol used by a networked system to transmit the message. That is, once the message has been received, the method by which it was received is generally no longer considered in its processing. RICA 101 preferably functions as a gateway, offering connections in and out of the supply chain system 100 of the preferred embodiment, and comprises an incoming system and an outgoing system.

The incoming system of RICA 101 defines how messages enter the system 100. Messages enter the system from a networked partner or web/API-enabled partner, such as the first, second or third trading partners 10, 11, 12, are authenticated, and then securely stored before acknowledgement. A two-step authentication process, described further below, is utilized in authenticating the networked trading partner 10, 11, 12 in order to reduce the friction in troubleshooting connectivity issues for the normally troublesome certificate-based connectivity methods.

The outgoing system of RICA 101 defines how messages destined for recipients, who are also comprised of one of the first, second, third or other trading partners 10, 11, 12, leave the message translation system 100. The outgoing system may receive incoming connections (pull), or it may actively make connections to the receiving client system (push), to deliver messages.

The preferred system 100 has the ability to receive messages via any number of endpoints across a horizontally scalable service. Endpoints are provisioned at run-time. The system 100 may queue messages in an arbitrary number of priority or process-oriented queues. After messages are received via a connected trading partner 10, 11, 12, they are stored for processing. RICA 101, Scribe 103, and the Portal 102 can be used to assign priority or specific processing characteristics (e.g., "messages from a specific partner must be processed in under three minutes (3 min.)").

RICA 101 is preferably an acknowledgment-based system. In operation, the trading partner 10, 11, 12 submits a message to RICA 101, which acknowledges receipt of the message. After RICA 101 receives the message, regardless of the user or protocol type, a process between RICA 101 and Scribe 103 is initiated. RICA 101 transmits an Authorize command to Scribe 103, passing the certificate of the user. Scribe 103 returns a Business Unit result associated with the transmitted certificate. In response, RICA 101 transmits the message to Scribe 103, along with additional information relating to the message. The message is passed from RICA 101 to Scribe 103 by a Put Message command, which is acknowledged to RICA 101 by Scribe 103. Preferably, messages are only acknowledged by RICA 101 to the Networked System after Scribe 103 has acknowledged to RICA 101 so that the system 100 does not accept responsibility for a message until it has been securely persisted. The processed message and a Delivery Book or flipbook associated with the message are finally returned from Scribe 103 to RICA 101.

Portal 102 includes a user interface accessible to users of the message translation system over a network, such as the Internet or other Wide Area Network. Portal 102 stores and manages data in the Scribe 103 system, and manages configuration information used by RICA 101 and the Service Fabric 104. Generally the message translation system is accessible through a Portal 102 available to service providers (e.g., logistics) and the customer, such as the trading partners 10, 11, 12.

Portal 102 includes options for Master Data, configuration, administration, and maintenance of the system, such as provisioning, debug, and enablement of connections. The Master Data area contains relevant business information, including contact information and other relevant details related to business, payments, networks, and processing. The configuration area includes connectivity details for RICA 101 and data enhancement/transformation information for the Service Fabric 104, including how messages are passed in and out of the system 100. The administration area includes details about the trading partner 10, 11, 12, as well as related business units, connections with other trading partners 10, 11, 12, network management, and other details. Maintenance functions include the ability to observe the use of communications, the health of the system 100, and metrics, such as which messages, and how many messages have been processed by the supply chain system 100.

The system 100 may also contain components for operations, management, and maintenance, of the various components and their connection and use. In a preferred embodiment, an Operations module manages and maintains the systems and their operation. This includes oversight for development of the system, technical support, documentation of systems and process, system administration, and other details related to regular operation and metrics. A supervisor process may also preferably be implemented to monitor the proper functioning of one or more of the other components.

The Service Fabric 104 picks up messages coming in to the system from RICA 101. The Service Fabric 104 acts as the integration platform for the message translation system. It handles message processing, transformation, validation, and other value added services. The Service Fabric 104 does the work of the network by facilitating communication of messages in, through, and out of the system 100. The Service Fabric 104 uses Scribe 103 for persistent data storage and retrieval. Configuration is retrieved via Scribe 103 and managed via the Portal 102. Results and metrics may be observed via the Portal 102.

In a preferred embodiment, the Service Fabric 104 includes (1) actors in a framework including a "Warden" 105, a "Mouse" 106, and a "Guide" 107, and (2) a set of services 108. The Warden 105 is preferably a supervisor process that monitors the system 100 for receipt of new messages and upon receipt of new messages calls or creates a Mouse 106. The Warden 105 may create numerous Mice 106 for completing operations in accordance with the preferred system 100. If unprocessed messages are found, a Mouse 106 is created for each unprocessed message. The Mouse 106 is preferably a worker process or a supervisor process that receives or requests a service from the Guide 107. The Guide 107 is preferably a service for the worker process or the Mouse 106. Service Fabric 104 is preferably implemented in a multi-paradigm programming language, such as a scalable language or SCALA.

Service Fabric 104 may perform steps of: de-queuing messages from an arbitrary number of message queues, storing messages in their initial state, extracting Concepts from Messages, recognizing messages via extractions, routing messages via recognition output, and, optionally, based on the route, performing: custom extractions, Canonical transformation, data enrichment, database lookups, master-data validation and cross-referencing, content-based validations, business rules and alerting, reporting and analytics, populating messages through reversal of extraction, delivering messages to arbitrary number of endpoints, and relating messages via a correlation service.

Each message received by RICA 101 is preferably processed by an independent mouse 106, which retrieves a Routing Slip that specifies Services 108 in a "route" to analyze, modify, validate, or deliver the message. These routes can be combined to enable a high level of flexibility and customizability. The process begins by obtaining configurations for the sender, receiver, and message type. If the configurations are found, a routing slip heuristic is applied, and the system 100 searches for an unambiguous match for the configuration. If an unambiguous match is found, the routing slip is returned. If the configurations are not found, or no unambiguous match is found, troubleshooting is initiated to address the problem, such as by routing to fix-me 109.

Figure 2:
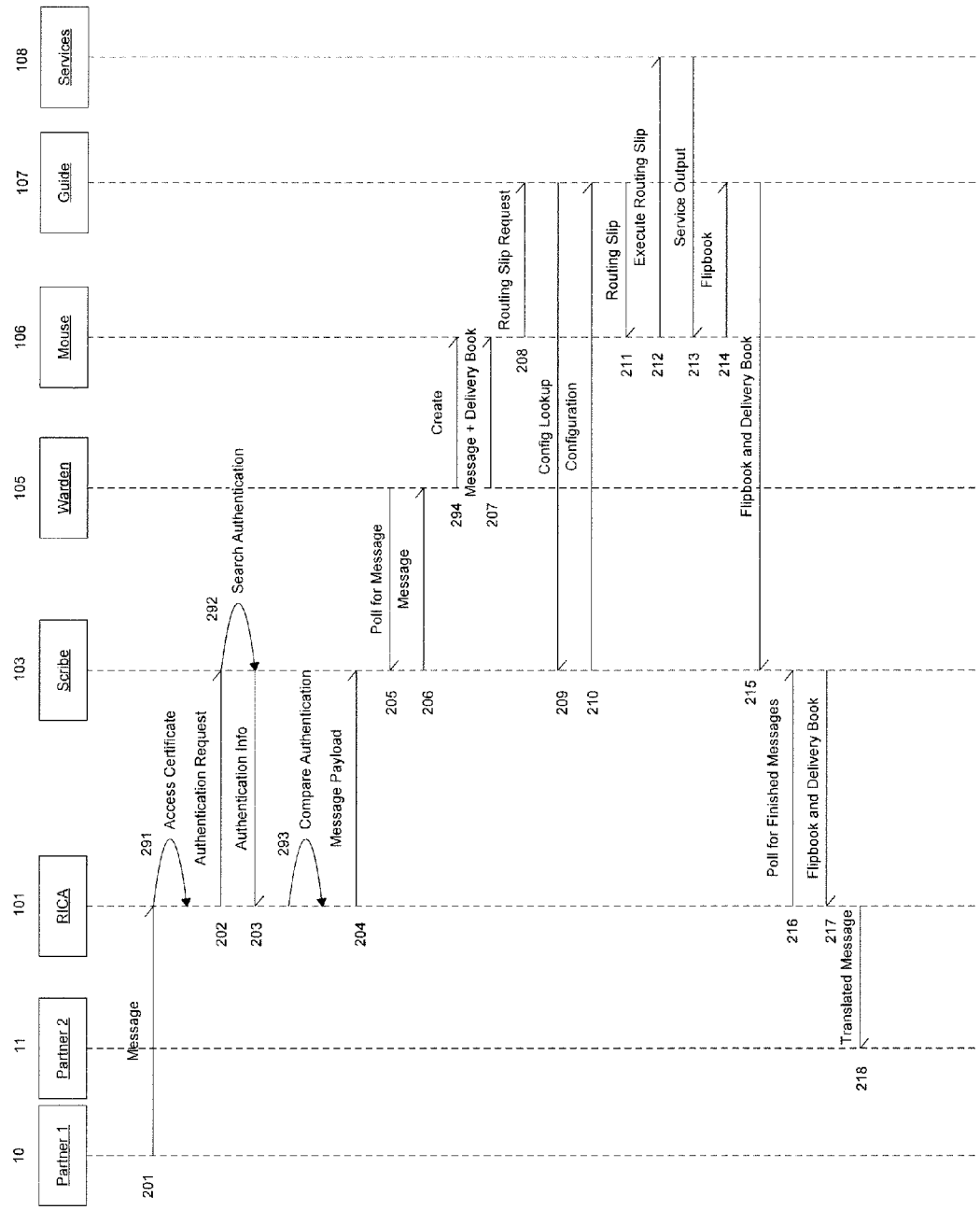
FIG. 2 is an exemplary sequence diagram of receipt, translation, and delivery of a message by the supply chain system of FIG. 1.

FIG. 2 is a sequence diagram of an example of message translation by the preferred supply chain system 100. In a preferred embodiment, at 201, an electronic message is directed from a sending trading partner, such as the first trading partner 10 to RICA 101. At 291, RICA 101 accesses client certificate, when using hypertext transfer protocol secure ("HTTPS") formats, or login and password, when using virtual private network ("VPN"), and identifies a resource identifier, preferably a uniform resource indicator ("URI"), contained within the request.

At 202, RICA 101 requests authentication of the certificate or login/password and URI from Scribe 103. Scribe 103 searches for the authentication in its storage based on the configurations stored from the Portal 102 at 292. Scribe 103 sends authentication information to RICA 101 at 203.

At 293, RICA 101 compares the authentication information from Scribe 103 to the stored information, which was received in the initial direction of the message from the first trading partner 10 to RICA 101, at 201. If authenticated or the information is confirmed, RICA 101 accepts the payload of the message itself into the system 100, stores the message as a new message in Scribe 103 and creates a delivery book that includes information about the first trading partner 10, at 204.

The full message is preferably not allowed into the system 10 until the initial authorization is completed and confirmed. Accordingly, messages from unknown individuals or organizations, such as individuals or organizations that are not yet authorized trading partners 10, 11, 12, are not received and/or stored in the system 100 until the identity of the trading partner is confirmed or authorized. If the trading partner is not authenticated, the payload or message is rejected and an error is sent to the exception-handling FIXME component 109.

At 205, Warden 105 is preferably configured to repeatedly poll Scribe 103 for new messages in need of processing. If a new message is found, the Scribe 103 notifies the Warden 105, at 206. The Warden 105 then creates a Mouse 106, pulls the message and delivery book, at 206, and sends the message and the delivery book to the mouse 106, at 207, for processing of the message and delivery book by the Mouse 106 in the Service Fabric 104. The Mouse 106 requests a routing slip at 208 from the Guide 107 and creates a flipbook, which includes the delivery book. The Guide 107 sends a request, at 209, to the Scribe 103 for the configuration of the message based on the contents of the flipbook. The Scribe 103 sends the configuration to Guide 107 at 210. If no configuration is present or pre-existing, then the flipbook is sent to the error-handling Fix-Me process 109.

The Guide 107 then sends a routing slip that is based on the configuration received to the Mouse 106 at 211. The Mouse 106 appends the flipbook based on the process. The Mouse 106 executes the routing slip based on the Services 108 contained in the routing slip at 212. At 213, the Mouse 106 saves output from each service 108 to the flipbook. Once the routing slip and its indicated tasks are completed, the mouse 106 sends the flipbook to the Guide 107 and requests a new routing slip, at 214. The Guide 107 looks up the configuration to determine if additional Services 108 are needed. If additional services 108 are needed, the Guide 107 then sends a new routing slip to the mouse 106 at 211 and the mouse 106 executes the routing slip at 212. Once no routing slip is needed, the Guide 107 sends the flipbook and delivery book to the Scribe 103 detailing the receiver of the processed message at 215.

RICA 101 polls the Scribe 103 for any finished messages, as is represented by arrow 216. If a new message is found, RICA 101 pulls the flipbook and delivery book from Scribe 103 at 217. RICA 101 then sends the translated message contained in the flipbook to the trading partner 11, 12 identified in the received message as the recipient, based on the instructions contained in the delivery book at 218. If an error occurs, then the flipbook is sent to Fix-Me 109.

Trading partners 10, 11, 12 connecting to the preferred supply chain system 100 are assigned a unique endpoint for message delivery. These endpoints can be provisioned dynamically at run-time and will enable loading and associating authentication information to an endpoint without having to restart or redeploy the supply chain system 100. This allows more directed testing and analysis when there are issues connecting to the supply chain system 100.

Trading partners 10, 11, 12 preferably have the ability to associate client certificates or username/password authentications with their endpoints. Certificates will be stored via Scribe 103 and associated by the authenticated trading partner 10, 11, 12. Optionally, certificates may be generated for users that do not have the requisite knowledge. While authentication is generally discussed below with respect to certificates, it is to be understood that any other combination of uniquely identifying characteristics may be used, such as, for instance, a combination of IP address and recipient address.

As described above, a two-step authentication process is utilized in authenticating the Networked Partner in order to reduce the friction in troubleshooting connectivity issues associated with certificate-based connectivity methods. The supply chain system 100 may use information regarding authentication failures to assist in this troubleshooting. The two-step authentication is described briefly with respect to FIG. 3, then in detail with respect to FIG. 4.

Figure 3:
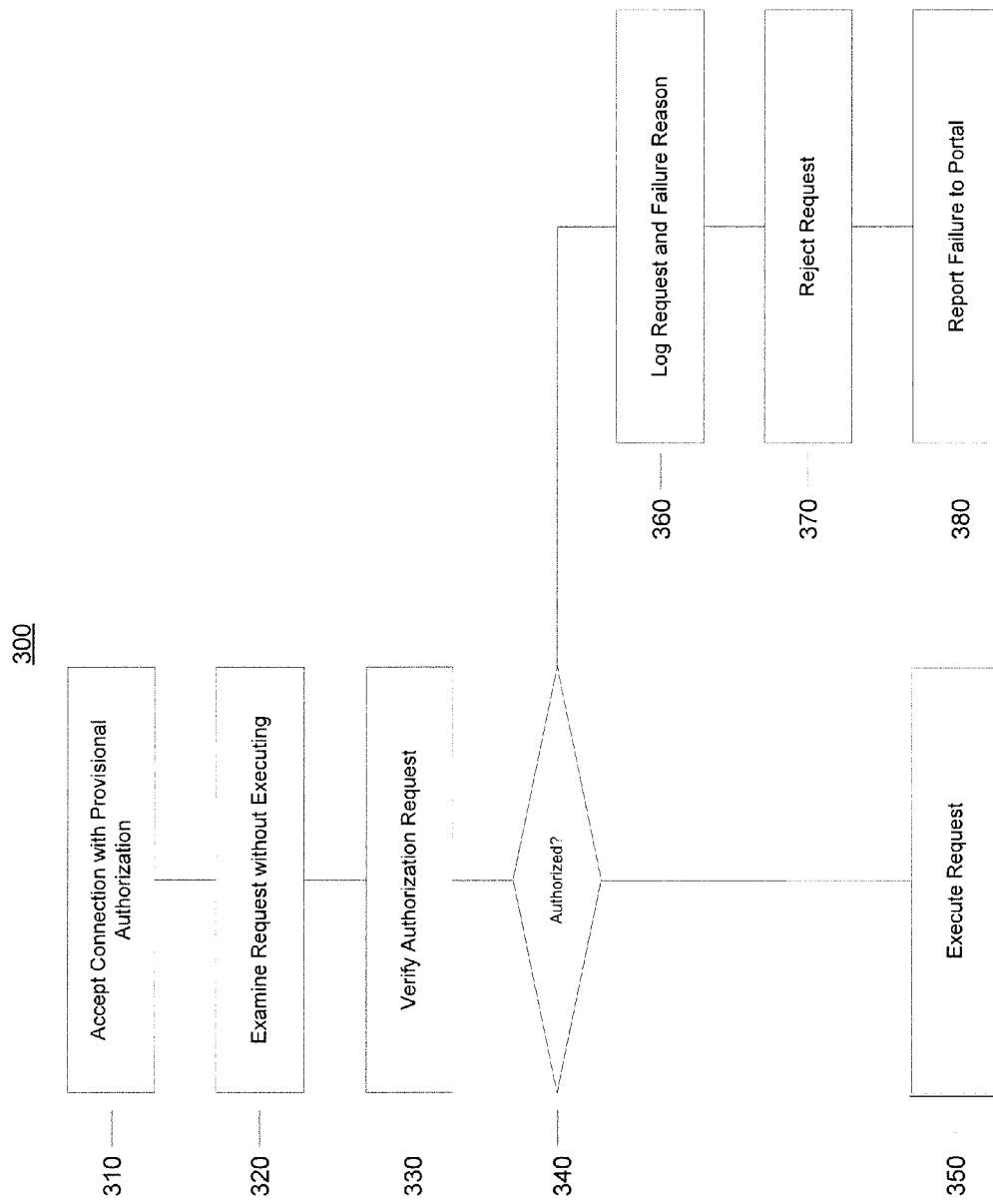
FIG. 3 is an exemplary flow chart of a two-step authorization method of the supply chain system of FIG. 1.

FIG. 3 is a flow chart of a two-step authentication process 300. At 310, a connection from one of the trading partners 10, 11, 12 is accepted with provisional authorization. The client certificate is used to establish a secure tunnel regardless of whether the certificate is known to the supply chain system 100. At 320, the request is examined without being executed. In particular, the resource identifier associated with the request, preferably a uniform resource identifier ("URI"), is determined. At 330, to verify the request, the user or trading partner 10, 11, 12 associated with the determined URI is identified. The certificate used for the request is then compared to the certificate for the user or trading partner 10, 11, 12 associated with the URI to determine whether the request is authorized. If, at 340, a match is confirmed, the request is executed at 350. If the certificates do not match, troubleshooting steps are performed. For instance, at 360, the request and the reason for failure are logged. At 370, the request is rejected. At 380, the failure is reported to Portal 102 for viewing by the user, the trading partner 10, 11, 12 or a system operator. It is to be understood that the troubleshooting steps may vary based upon the reason for the failure, such as the specific details of the certificate that did not match.

Figure 4:
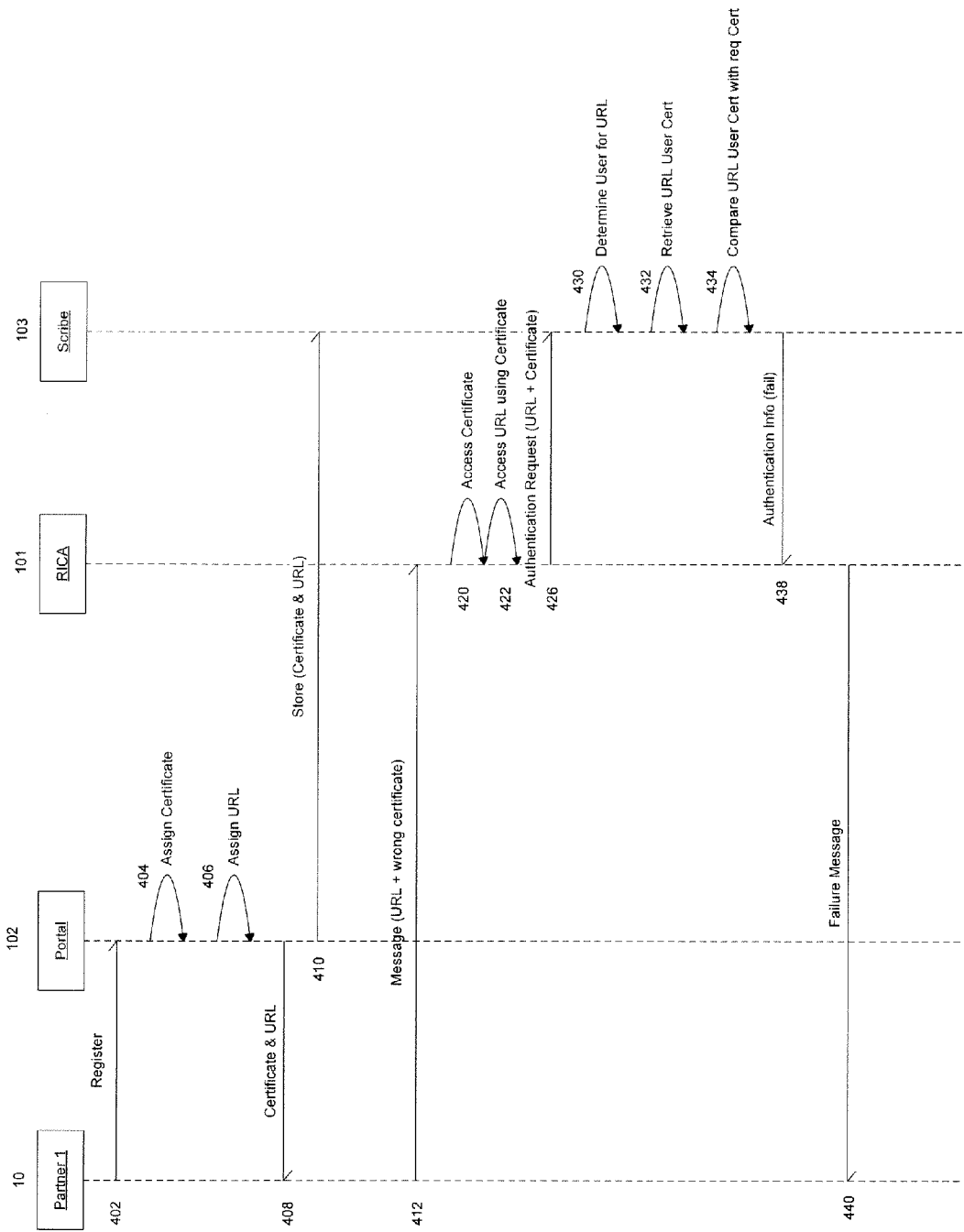
FIG. 4 is an exemplary sequence diagram of a two-step authentication in the supply chain system of FIG. 1.

FIG. 4 is a sequence diagram of an example of operation of the preferred supply chain system 100 using certificates using an example of failed authentication. In the following example, it is to be understood that steps are shown to be associated with a particular component of the supply chain system 100 for clarity, but may be performed by other components within the scope of the invention.

In a preferred embodiment, each valid user, trading partner 10, 11, 12 or group of users of the supply chain system 100 preforms a registration process 402, either indirectly or via Portal 102. At the time the user account is established, the user or trading partner 10, 11, 12 is preferably assigned a credential such as an encryption key or certificate at 404. The certificate is preferably a secure sockets layer ("SSL") or transport layer security ("TLS") client certificate. The user or trading partner 10, 11, 12 is also preferably assigned a unique resource identifier or address for accessing the system 100, such as a unique URI or root URI, at 406. The credential and resource identifier, preferably a certificate and URI, are provided to the first trading partner 10, at 408. The certificate or the public key from the certificate, and URI are also provided to Scribe 103 for storage for later use in authentication. In some cases, the trading partner 10, 11, 12 may provide its own certificate for use with the system 100.

At 412, the first trading partner 10 attempts to connect to send a message. In this example, the first trading partner 10 presents an incorrect certificate along with the correct assigned URI for the account encrypted within the request. The connection attempt of 412 may comprise a number of exchanges and may follow the general steps of, for instance, a client-authenticated TLS connection handshake process. The certificate may be in X.509 form and contain a public key for the client, user or trading partner 10, 11, 12.

RICA 101 accesses the received credential at 420 to establish an SSL tunnel and access the URI within the request at 422. RICA 101 may use the certificate presented with the request without regard to whether it is valid for the system, using it merely to establish the tunnel and gain access to the URI associated with the request. In other embodiments, RICA 101 may require that the certificate at least be associated with the supply chain system 100 to perform any action.

At 426, RICA passes the URI and certificate to Scribe 103. Scribe 103 then identifies a user associated with the URI, such as one of the first, second or third trading partners 10, 11, 12, at 430. Scribe 103 retrieves the stored certificate associated with the identified user at 432 and compares the stored certificate associated with the user with the received certificate at 434. Through the comparison of certificates, the supply chain system 100 determines whether the received certificate is valid for the user associated with the requested URI. If the credential is not valid for the identified user associated with the URI, the system 100 denies access to resources associated with the resource identifier, thereby causing the associated message to be refused. Scribe 103 then sends an indication of the failed authentication to RICA 101 at 438.

The presence of the valid resource identifier inside the request, however, may be an indication that an otherwise valid user, such as one of the trading partners 10, 11, 12, is simply using the wrong credential. Thus, RICA 101 may initiate troubleshooting and, for instance, at 440, communicate information to the user associated with the requested URI, such as one of the trading partners 10, 11, 12, via a previously stored contact address to convey the fact that the received credential is not valid for the user associated with the resource identifier in the request. The user may then attempt the request again using the correct credential, or perhaps indicate that the connection request did not originate with that user.

Figure 5:
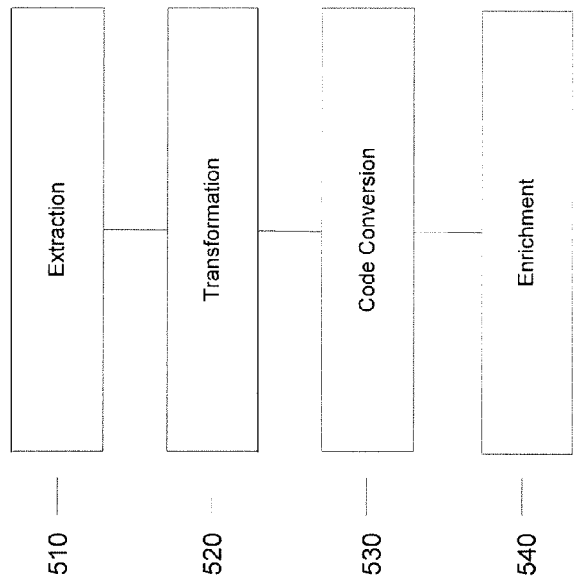
FIG. 5 is an exemplary flowchart of business data rationalization of the supply chain system of FIG. 1.

FIG. 5 is a flow chart of a process 500 of Business Data Rationalization of the preferred supply chain system 100. Business Data Rationalization preferably occurs in four steps, the first two steps, Extraction 510 and Transformation 520, modify the structure of the message, while the last two steps, Code Conversion 530 and Enrichment 540, deal with the content of a Business Message.

At 510, Extraction is performed. During the extraction phase the source data is converted from its native format into a data format understood by the system 100. This early representation of the message is still in the 'shape' of the inbound message, but the data elements have begun to be named. This process is part of the translation of the message from the format or language of the trading partner 10, 11, 12 into the format or language of the preferred system 100.

At 520, Transformation is performed. Transformation allows changing the structure or shape of a message, as well as to change the 'extracted names' to 'canonical names' of Business Concepts. Business Concepts are descriptors relating to a transaction. They are preferably semantically meaningful names such as "Purchase Order Number" and "Delivery Date." Business concepts are the standard communication method for all services and applications of the message translation system. After data is decoupled from standard-based formatting all services can use the set of business concepts to determine how to operate on a message.

The semantically meaningful names may be further transformed into "universal business concepts." Universal business concepts are business concepts that allow association of additional parameters. Examples of universal business concepts include Reference, Date, Partner, Pricing, Contact, Quantity, Currency, Location, Instructions, Payment Terms, Transport Details, Packaging, Identifier, Equipment Details, Purchase Order Type, Unit of Measure, Country, Language Code, Product Information, and Transport Mode. The semantically meaningful name "buyer," for instance, may be transformed into the universal business concept "Partner (buyer)," where "buyer" is a parameter clarifying the type of "Partner." Services such as validation, business rules, applications, correlation, alerting, notification, extraction, code conversion, enrichment, master data validation and cross-referencing, reporting, dashboard, error handling and support, message routing and orchestration, and data enrichment may be performed on the universal business concepts.

At 530, Code Conversion is performed. Most business messages use codified values to represent commonly used data elements. Units of measure are typically chosen from an existing industry-standard set (e.g., UNEDIFACT Rec. 20, or ANSI X12 355). Code conversions are both standard and configurable, as typically a trading partner 10, 11, 12 will support only a subset of a particular code list. The values found in the message are converted to those supported in the Canonical message. This is also part of the translation process.

At 540, if the message does not have the information necessary to satisfy the Services 108 of the routing slip, data enrichment is used to fill in the missing pieces. In order for all message transformations to be reversible, the side or portion of the message with a missing element is assigned a "virtual" or "remainder" element, which corresponds to the missing element. At runtime, the preferred system 100 uses a configuration to supply this information or initiates a fix or repair process by sending the message to Fix-me 109. This process is meant to be exemplary and not limiting and the system 100 may otherwise or alternatively address a message that has missing sides or portions, such as by requesting additional information from the trading partner 10, 11, 12 who sent the message, searching for appropriate information that may otherwise be available for access by the system 100 or otherwise similarly addressing the missing information.

The enrichment step causes the remaining actions to be taken that are required for a message to fit the Canonical form. This may include, for example, the conversion of a date format, or the addition of leading zeros. In certain situations, not all the required canonical data elements are included in an inbound message. The Enrichment step 540 may, therefore, provide the ability to "hard-code" values or programmatically insert calculated or inferred values. This step can also be used to add Business Data to the message, based on how it is configured in the system 100. For example, a location identifier can be used to load an address into the message, or a product ID may be used to load its product identifier.

Rationalization 500 is preferably configurable by trading partner 10, 11, 12 and by message. These Rationalizations (e.g., extractors or Populators) are stored as configuration information and are searchable, reusable, reversible and reportable. Storing this information as a configuration allows the preferred system 100 to be a learning system 100 that will leverage existing data to simplify future Business Message Transformation. The gap between two connected trading partners 10, 11, 12 can be analyzed or the required data elements for a new trading partner 10, 11, 12 connecting to an existing trading partner 10, 11, 12 may be explicitly stated. Furthermore, specific sets of concept requirements may be defined by business processes, or applications that can be used at design time. Rationalization may also handle message formatting, code-lists, and other requirements specific to the origin/destination message.

The Rationalization 500 is also preferably reversible. That is, once a message has been transformed through the Rationalization process through the fabric 104, not only is the configuration process that the message has gone through stored, preferably so that it can be repeated, but the configuration can also be used by the Services 108 in reverse order to transform a message to its original format. The system 100 is preferably able to use a configuration in its native sequence, and in a reverse sequence, such as the mouse 106 executing the routing slips (arrow 212) and the mouse 106 saving the output (arrow 213), which helps to eliminate a significant amount of duplicated effort when working with an existing message set. Directionality of the message (inbound or outbound) is generally not a factor, as would be apparent to one having ordinary skill in the art based on a review of the present disclosure.

Business Concept requirements and validations can be managed at the edges of the system, but communicated through the processing layer. This will allow a user to decide which standards they will support at design-time, or to quickly analyze the impact of a new trading partner 10, 11, 12 on-boarding.

After the four phases of rationalization of process 500 are completed, the Canonical message is preferably achieved. The Canonical is the supply chain system's 100 internal format of a Business Message, on which applications, optimizations and reporting and analysis services are built. The Canonical is flexible at a content level, and not limited as to what data it can contain. However, requirements are defined based on specific trading partners 10, 11, 12 or a specific process that can be enforced dynamically to ensure proper communication.

During on-boarding of each new trading partner 10, 11, 12, a reusable mapping, or configuration, for translation of messages from the trading partner message exchange format to the Canonical format may be created. Creating such mappings, however, may be time-consuming and costly. In some embodiments, therefore, the capability may be provided to accept messages without prior development of a mapping for a particular trading partner 10, 11, 12. Fields from incoming messages with known or determinable meanings may be mapped to business concepts on-the-fly. EDI messages, for instance, may be particularly amendable to being ingested without a specific trading partner onboarding process due to their known, predictable format. In some cases, only a subset of the fields of a message with known meanings may be mapped. If the fields that can be mapped are sufficient for conveying key aspects of a message, such as key terms of a purchase order, interaction with the trading partner 10, 11, 12 may continue without the need for on-boarding.

The Canonical may preferably be represented in the form of an extensible markup language ("XML") file on disk. However, in some embodiments, operational efficiency may be achieved by bypassing the steps of writing an XML file to storage and reading it for subsequent delivery. Instead, the intermediate format may be held in-memory.

As the volume of message handling increases over time, it becomes increasingly difficult to know what the system 100 was doing exactly during normal operation, and especially when an error occurs. Therefore, the supply chain system 100 is preferably designed to provide knowledge regarding the operation of the system 100 while it is running. Data structures, such as the flipbook, that are self-documenting and immutable are used to record all actions. They preferably cannot be changed once they are created.

Using a flipbook like data structure, all actions initiated regarding an incoming message are recorded on a separate page of the flipbook. Each page of a particular flipbook represents a state change during message processing of that message. As a result, when processing for a specific message fails, it is always clear what happened and where the processing stopped or failed so that corrective actions may be taken.

Authorized users or trading partners 10, 11, 12 are provided the ability to fix problems while the full context of a failure is still known. The Fix-Me process 109 implements a path to resolve normal or typical system issues that are due to configuration errors or other related errors. This makes sure that most errors that can occur will be quickly detected and fixed. All failed messages and their flipbooks are preferably registered with the Fix-Me 109. An authorized user or trading partner 10, 11, 12 can then inspect a flipbook in order to decide how to resolve an issue. If the failure is due to an erroneous configuration, the user or trading partner 10, 11, 12 or the system 100 can change this configuration while the system is running. Preferably, the new configurations can then be tested on the failed message in simulation mode without side effect. Once the erroneous setup has been fixed the original message can be reprocessed using the new configuration.

As described above, a number of situations may lead to the supply chain system 100 being unable to completely translate a particular message. For instance, the preferred system 100 a) may not know the meaning of an incoming piece of a message, b) may know the meaning of an incoming piece of a message but determine that the piece of the message is invalid, c) may require a portion of an incoming message for proper translation, but determine that that portion of the message is not present or d) may make a related determination or observation.

Certain of these problems simply require correction and re-sending of the message. Incoming message data that is absolutely required and missing, for instance, may require intervention from the sender, such as from one of the trading partners 10, 11, 12. Similarly, data determined to be malformed or otherwise outside of acceptable ranges may also require the incoming message to be corrected, or a corrected message to be transmitted.

Other problems, however, may be cured, both for the present message and future messages, by adapting the configuration set or sets for handling those types of messages. That is, by fixing the underlying cause of the translation issue, the preferred system 100 is thereby adapted to handle those types of messages. The message that produced the error may then be reprocessed using the corrected configuration. While the description may refer to "errors," it is to be understood that the processes described are actually an integral part of the training and configuration of the supply chain system 100. By detecting translation issues and modifying system data, the system 100 is adapted to handle a wider variety of message translation tasks.

Figure 6:
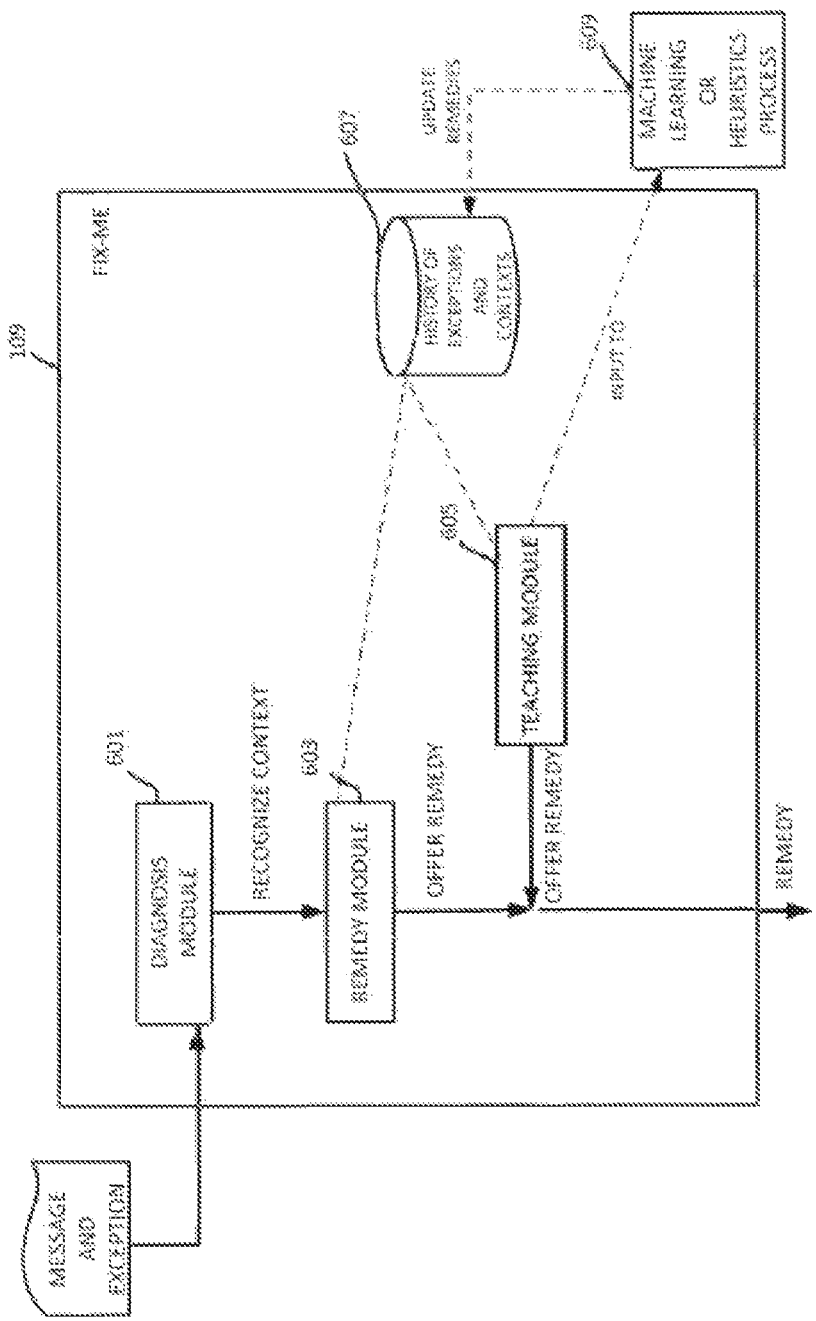
FIG. 6 is an exemplary flowchart of a preferred fix-me process utilized with the preferred supply chain system of FIG. 1.

Referring now to FIG. 6, in a preferred embodiment, the Fix-Me process 109 is a trans-contextual process that provides resolutions via modules which include a diagnosis module 601, a remedy module 603, and a teaching module 605. The diagnosis module 601 is preferably configured to recognize a way that a supplied context is wrong for a supplied message and exception or where in the various processes of the supply chain system 100 the message failed and potential fixes the may be applied to the message, such as fixes that are similar to those applied to similar messages that failed at similar stages or in similar contexts in the system 100. The remedy module 603 is preferably for prescribing remedies. The remedy module 603 may also perform the operations of changing of a context and possibly the changing of a message, such as changing values in the message, message destination, timing or other related message content or routing. The teaching module 605 is preferably for providing additional instructions and explanations for a remedy prescribed by the remedy module 603. The teaching module 605 may also provide such instructions and explanations as feedback to the overall Fix-Me process 109 in an effort to improve context recognition and resolution suggestions.

The Fix-Me process 109 may implement a path to resolve issues with the preferred system 100 that may be due to the following non-exhaustive list of process steps: (1) errors that occur during authentication of a customer or trading partner 10, 11, 12 to the RICA 101 component when receiving inbound messages; (2) errors that occur during the actual transfer of message contents from the trading partners 10, 11, 12 to the RICA 101 component after authentication; (3) configuration errors while processing messages in the Service Fabric 104; (4) processing errors while processing messages in one of the services of the Service Fabric 104; (5) errors that occur during the sending of outbound messages from the RICA component to the trading partners 10, 11, 12; and (6) relates failures or errors that occur as the messages are processed through the system 100.

The Fix-Me process 109 defines several services that may suggest one or more resolutions for business process messages. The Fix-Me process 109 may recognize the context of a business process message, identify when there is an error in the context, and may suggest changes to the message and context to correct the error. The Fix-Me process 109 may also determine that an error or failure is not appropriate for automated manipulation and/or repair and may determine a method for routing the failed or corrupted message to the trading partner 10, 11, 12 or other actor in the system 100.

The importance and subtleties that arise when dealing with the context of a message may be explained by making an analogy to a phenomenon that can occur when a customer returns an item to a store because it doesn't meet expectations. In this particular analogy, the storeowner enters into a discussion with the customer about the validity of returning the item. After some discussion, the customer gets annoyed and says, "This is not OK". The customer (the sender of the message "this is not OK") is referring to the way that the storeowner is handling his return of the item. The store owner (the receiver of the message "this is not OK") interprets the message as relating to the quality of the returned product, and the discussion escalates. Resolution in this instance would be recognizing that the context of the message was related to the overall handling and not the context of the quality of the product (through a diagnosis). Then suggesting changing the context so that the message can be correctly interpreted (resolution or remedy suggestion). Finally, learning that the message can be interpreted in two contexts and picking the right one.

In a somewhat similar fashion, the Fix-Me process 109 may perform one or more operations on the message and its context using the above discussed actors (e.g., diagnosis module 601, remedy module 603, and teaching module 605). Many examples exist in which the there may be errors in the messages and a change in context may resolve the error, some preferred or common examples are listed below:

1) A message may be submitted to a unique customer endpoint where the authentication does not match the expected communication protocol for that unique endpoint.

The Fix-Me process 109 preferably recognizes the context created for authentication and protocol and sees that the customer or trading partner 10, 11, 12 has a different unique endpoint where the protocol would match. As a remedy, the Fix-Me process 109 may capture the protocol and change the message submission context by transforming the protocol after successful authentication. The Fix-Me process 109 preferably relies on a history of message failures that may relate to the particular customer, trading partner 10, 11, 12 or recipient associated with the particular message that is stored in the "History of Exceptions and Contexts" module or database. The Fix-Me process 109 also preferably relies on the history of messages and their flow through the system 100 represented by the flipbooks created by the flow of previous messages through the system 100. In the preferred embodiment, all of the flipbooks created as the result of messages flowing through the system 100 are stored in the "History of Exceptions and Contexts" module or database for reference by the FixMe process 109 to determine potential fixes via analysis by the diagnosis module 601, the remedy module 603 and the teaching module 605. The Fix-Me process 109 may then report the correct protocol/endpoint combination back to the customer or trading partner 10, 11, 12.

2) A message in the Fabric has an incomplete processing configuration

The Fix-Me process 109 may recognize that the customer or trading partner 10, 11, 12 has an incomplete configuration setup for the message, but that it has a network configuration for related messages. The network configuration for related messages is preferably stored in the "History of Exceptions and Contexts" module or database as the result of numerous previous messages flowing through the system 100. Executing the business processing in the context of one of the existing configuration may be successful. As a remedy, the Fix-Me process 109 may suggest network configurations that may lead to a successful processing of the business process message.

3) A message in the Service Fabric has no processing configuration

The Fix-Me process 109 may recognize that the customer or trading partner 10, 11, 12 has no configuration setup for the message, but that it has a network configuration for related messages. Executing the business processing in the context of one of the existing configuration may be successful. As a remedy, the Fix-Me process 109 may suggest network configurations that may lead to a successful processing of the business message.

4) An outbound message fails to be delivered to the customer because RICA cannot establish a valid connection to the customer (outbound)

The Fix-Me process 109 may recognize that RICA 101 cannot deliver the message in the context of the protocol, message type and authentication methods supported by the customer or trading partner 10, 11, 12 for accepting messages from RICA. As a remedy, the Fix-Me process 109 may i) suggest a resend to test physical connectivity within the same context of the protocol, message type and authentication methods; and/or ii) suggest a different context for delivering the outbound message, in an automated fashion that can be subscribed as a request by the trading partner 10, 11, 12.

5) Outbound message fails delivery (for example, partner's processors are out of service for maintenance)

The Fix-Me process 109 may cause future messages to wait in a "paused" state (to prevent future errors/maintain order of messages) until the original message is delivered successfully. As a remedy, the FixMe process 109 and/or RICA can 'ping' the server until the trading partner's 10, 11, 12 processors are back on-line or again accepting messages, and then auto-resolve the issue when the trading partner's 10, 11, 12 processors are again able to receive messages. A non-limiting example of execution mechanisms may include: a. Message fails delivery; b. Connection goes into 'down' state, messages paused; c. RICA pings for connection back up; d. Repeat 'c' until back up; and e. Redeliver all paused messages in order after a first message is again successfully delivered to the trading partner's 10, 11, 12 processor.

Resolution processes, as discussed hereinthroughout, may be simplified through one or more teaching mechanisms. Such simplification may be taught by the teaching module 605, wherein the teaching module 605 is responsible for storing such knowledge and making it available to enhance the overall knowhow of the system 100. For example, the system 100 can learn that a particular type of failure (e.g., xref-missing for vendor code XXX) may require a resolution from a specific agent. Through the Fix-Me process 109 (via the teaching module 605, for example), a user or trading partner 10, 11, 12 can be directed to the specific configuration to modify, and then reprocess the message that failed as a result of saving an update. A non-limiting example of such resolution steps is as follows:
1—message missing vendor code fails;
2—email client, indicating no vendor code for partner XXX, click here to resolve;
3—client clicks link, edits and saves configuration; and
4—system 100 reprocesses all messages that were waiting on the vendor code for partner XXX.

By eliminating the need to do data preparation and processing, the preferred system 100 and Fix-Me process 109 enables rapid development of messaging applications to support, automate, or optimize any sort of process. While in the preferred embodiment, the supply chain system 100 is applied to automating and optimizing Supply Chain communications, it may similarly be used in a variety of other applications requiring automating and integrating the exchange of information, such as in the medical and regulatory fields.

As would be understood by one skilled in the art, the supply chain system 100 of the preferred embodiment may be implemented using a variety of hardware configurations. A single computer may provide all functions, or functions may be allocated amongst multiple machines, physical or virtual. For instance, data storage may be allocated to a specific machine or group of machines running database software. Portal 102 may utilize one or more separate web servers or load balancers. Each computer in the system 100 may comprise a process for executed stored program code for performing the processes and methods described herein. Each computer may also comprise one or more network interfaces for communicating information as described. Each computer may also comprise one or more memories and storage devices for storing program code and data.

A preferred embodiment of the present invention is also directed to a system and method for efficiently developing solutions to a constrained event that preferably initiates based on receipt of a message from one or more of the trading partners 10, 11, 12. The constrained event typically results from trading partners 11, 12, 13 submitting messages and constraints to the central database 110 through the translation systems of the preferred system 100 and at least one of the trading partners 11, 12, 13 requesting viable or optimum results for the constrained event, such as delivery of goods from one of the trading partners 11, 12, 13 to another trading partner 11, 12, 13, which may include scheduling a delivery and unloading of goods at a depot 810, 820, 820. The events optimized utilizing the supply chain system 100 are preferably, specifically, supply chain events. The preferred system 100 is not, however, so limited and the system and method may be utilized with nearly any variety of event wherein solutions to constrained events are desired, such as selecting a viable airline flight, selecting various travel accommodations and/or transportation for a constrained trip, coordinating repairs and maintenance for a power plant shutdown and other like constrained events.

A preferred embodiment of the system 100 is directed to scheduling shipping appointments such as pickups and drop-offs of shipments at loading points, such as the depots 810, 820, 830. In the preferred embodiment, constraints related to the scheduling of an appointment at each loading point are converted to a plurality of binary temporal constraint masks with each binary value in the mask indicating whether the associated constraints allow or prevent scheduling of an appointment beginning at that time. The constraints are received from the trading partners 10, 11, 12, are translated by the system 100 into a format useful for manipulation by the system 100 and are preferably stored in the capabilities/constraints database 112. These binary temporal constraint masks are then combined to create an overall availability mask for a particular loading point. Information derived from one or more availability masks may then be presented to the user or trading partner 10, 11, 12 to allow selection of an appointment time for scheduling.

The preferred optimization system 100 utilizes the central database 110 having stored information or constraints in the capabilities/constraints database 112 that relate to capabilities and constraints of a plurality of the trading partners or market participants 11, 12, 13. The optimization system 100 or network of the preferred embodiment preferably has a large number of market participants 11, 12, 13 that are able to communicate through the central database 110 to facilitate coordination between the trading partners 11, 12, 13 in completing events. For example, the trading partners 11, 12, 13 may communicate with each other through the preferred system 100 to facilitate shipping of a product from the first trading partner 11 to the second trading partner 12 with the third trading partner 13 acting as a carrier or shipper to transport the product of the first trading partner 11 to the second trading partner 12. Additional constraints may be derived by the system 100 based upon information regarding the event to be scheduled. For instance, information regarding a product to be shipped and the quantity of that product may create or impact constraints related to viable loading points or the time required for a pickup or delivery appointment.

In the preferred system 100, the central database 110 receives a plurality of constraints that have been translated by the system 100 related to the supply chain event of a requesting trading partner 11, 12, 13 and the plurality of constraints are preferably stored in the capabilities/constraints database 112. Constraints may comprise information regarding loading point availability, product availability, business hours, staff availability, time required for various tasks and the distribution of that required time, as well as any other factors that may impact the ability of the task to be scheduled to be performed at a particular time.

The preferred system 100 is able to solve for viable times for heavily constrained events by breaking the constraints into constraint segments, which are concurrently solved and combined. A plurality of viable solutions or choices are calculated based on the plurality of constraint segments based in the capabilities/constraints database 112 and the plurality of constraints received from the trading partner 11, 12, 13. The viable solutions or choices are filtered resulting in a plurality of viable results that are transmitted to the requesting trading partner 11, 12, 13. The requesting trading partner 11, 12, 13 is then able to elect their desired viable choice or solution from the first and second viable choices.

The system 100 may determine that no viable choices are available for the specifically constrained event, thereby resulting in the system 100 notifying the requesting trading partner 11, 12, 13 that no viable choices are available for the particularly constrained event and certain constraints should be modified to relax the constraints. The notification message that there are no viable choices is translated from the internal configuration of the system 100 into the preferred format of the trading partner 10, 11, 12 before being sent to the particular trading partner 10, 11, 12. In addition, the system 100 may determine that only a single viable choice is available for a particularly constrained event and the single viable choice is preferably transmitted to the requesting trading partner 10, 11, 12 for election or rejection. Similarly, the system 100 is not limited to transmitting or calculating only the first and second viable choices, as the system 100 may determine that numerous additional viable choices are available for a particular constrained event and each of the viable choices may be transmitted to the requesting trading partner 10, 11, 12 for election or rejection. Further, the system 100 may be configured such that all viable choices are not transmitted to the requesting trading partner 10, 11, 12 and the transmitted viable choices may be limited to a specific number of transmitted viable choices or the system 100 may permit the requesting trading partner 10, 11, 12 to constrain the results such that a specific number of viable choices are transmitted for selection purposes. Each transmittal of messages and exchange of constraints typically includes a translation step between the format or language of the system 100 and the preferred format or language of the trading partner 10, 11, 12.

In a preferred embodiment, the system 100 receives the plurality of viable results and transmits information related to the supply chain event to the requesting trading partner 10, 11, 12. Accordingly, the system 100 preferably transmits more than just the viable result to the requesting trading partner 10, 11, 12, but also transmits instructions related to the viable result and supply chain event such that the requesting trading partner 10, 11, 12 is able to make an informed decision when determining if or which viable result to elect or implement. For example, the system 100 may transmit identification information, credit worthiness, timing, or other related information to the requesting trading partner 10, 11, 12 to assist the requesting trading partner 10, 11, 12 in electing one of the viable results that are transmitted based upon the various constraints.

Figure 7:
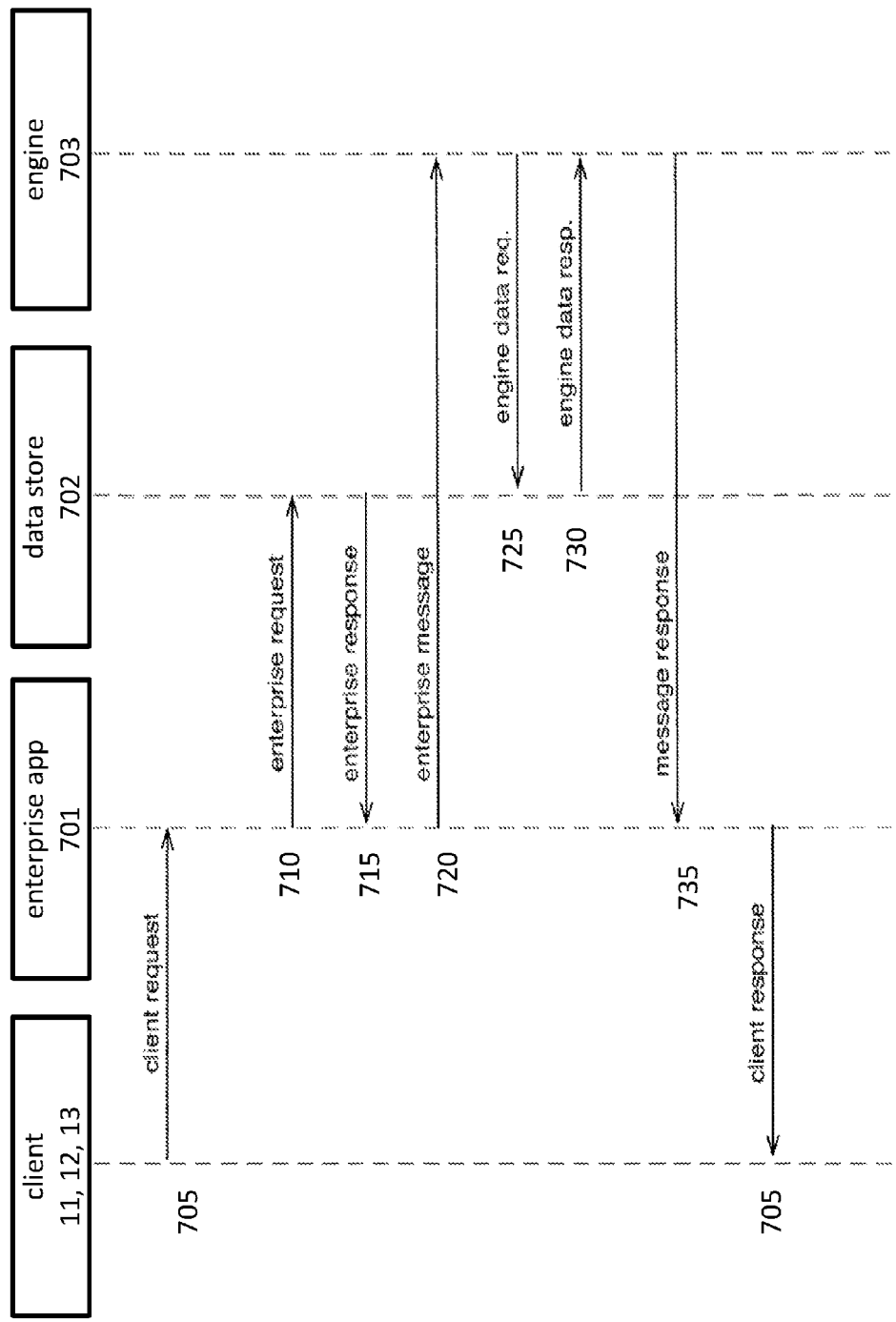
FIG. 7 is a FIG. 7 is a high-level sequence diagram of the process of obtaining time availability for a supply chain appointment in the supply chain system of FIG. 1.

FIG. 7 is a high-level sequence diagram of the process of obtaining time availability for a supply chain appointment to be scheduled. The preferred central database 110 includes an enterprise application 701 to interface with the trading partner or client 10, 11, 12, such as a carrier/shipper or client, a data store 702 and an engine 703. The preferred engine 703 includes a message queue, a master data portion, a validation state, a filter, a map and a reduction stage. The trading partners and clients 10, 11, 12 are substantially utilized interchangeably herein to identify users of the system 100, such as manufacturers, carriers, buyers, suppliers, shippers and related trading partners 10, 11, 12 in a supply chain.

The preferred system provides responses to the trading partners 10, 11, 12 related to booking or scheduling a shipment, booking or scheduling multiple shipments, the feasibility of booking or scheduling shipments, or other related matters. However, the preferred system 100 is not limited to providing responses to shipment related requests and their feasibility and may be utilized to provide responses or feasibility answers to other requests, such as classroom scheduling, student scheduling, patient scheduling, train scheduling, airline scheduling, multi-mode transport scheduling, vendor bidding and other related request responses and/or feasibilities. The preferred system 100 is particularly adept for providing scheduling and/or feasibility for events involving time as a variable. The preferred system 100 is typically able to reduce the number of messages that the trading partner 10, 11, 12 must send and receive prior to reaching a feasible solution to their request.

The trading partner 10, 11, 12, such as the carrier/shipper or client preferably sends a client request at 705 to the enterprise application 701, which sends information related to the request to the data store 702 at 710. At 715, the data store 702 provides an enterprise response to the enterprise application 701, which, at 720, sends the enterprise message to the engine 703. The enterprise message, sent from the enterprise application 701 to the engine 703, is received and accepted or rejected by the message queue within the engine 703. The engine data request and response is communicated between the data store 702 and the master data portion within the engine 703.

At 725, the engine 703 sends an engine data request to the data store 702, which, at 730, provides an engine data response to the engine 703. At 735, the engine 703 subsequently provides a message response to the enterprise application 701, which, at 740, provides a client response to the trading partner 10, 11, 12.

The master data portion of engine 703 checks the data set to ensure that the data required for the request is present. The relevant data is then validated in the validation state, filtered by the filter, mapped with the map and reduced and mapped through several cycles between the map and the reduction stage. In the validation state, the data is checked to ensure the data set includes valid or logical data. For example, if a drop-off location for goods that are being transported requires a forklift for removal from one vessel and transport to another and the elected drop-off location does not have a forklift, the validation state would eliminate the erroneous location and the associated data. In the filter, the data is preferably simplified and/or the proposed response(s) is simplified.

In the several cycles between the map and the reduction stage, the data moves back and forth such that the preferred system is able to optimize the answer or response to the request and/or to optimize multiple answers or responses to the request. The mapped and reduced data is subsequently sent to the filter to again ensure valid, optimal or good results. Following filtering and again mapping, the data is transmitted to the message queue and to the enterprise application 701 for transmittal to the trading partner 10, 11, 12. The process of transmitting the client request to receiving the client response preferably occurs in under a second (1 sec) in the preferred system 100, but is not so limited and may take more or less time to process the request, particularly in consideration of the complexity or intricacy of the request. In a preferred embodiment, determination of available appointment times occurs in "real time," such that the trading partner 10, 11, 12 perceives the response to his or her request to be essentially immediate.

In the preferred embodiment, the requesting trading partner 10, 11, 12 may be a carrier, a supplier, a manufacturer and a buyer. These particular preferred requesting trading partner 10, 11, 12 are known in supply chain events and are not meant to be limiting. For example, the requesting trading partner 10, 11, 12 may be comprised of any actor or company that is able to present to transmit constraints for a particular event and receive viable results from the system 100. The requesting trading partner 10, 11, 12, client or market participant of the preferred system 100 may include consumers, supply management personnel, tracking entities, consignees, storage facilities, or nearly any other entity that participates in a market or is involved in a market where constrained events occur.

In the preferred embodiment, typical constraints may include time, storage, operating times, appointments or potential appointment timeframes spanning one or more days, hours of operation, block time, previous appointments, intervals, fixed or variable durations, reservations, negative reservations, goods, volumes, release times, times, preferences, prices, subcarrier release times, subcarrier frozen times, preferences, requirements to combine shipments, requirements related to the type of party, fixed calculations, quantity-based calculations including step-functions, timeframes, large slot than shipment, product outages and product groups. Constraints are not limited to these listed constraints of the preferred system 100 and may be comprised of nearly any type and/or variety of constraint that places constraint and/or limits on a particular event and is typically related to the type of event that the trading partner 10, 11, 12 expects or desires to constrain. The constraints are preferably transmitted into the system via messages from the trading partners 10, 11, 12 and are preferably translated from the trading partner's 10, 11, 12 preferred format to the preferred format of the system 100 before storage in the capabilities/constraints database 112. The constraints, however, are not so limited and may be generated by the system 100 based on knowledge of the system 100 or otherwise received and manipulated.

The central database 110 may preferably be implemented using commodity computing hardware comprising one or more processors, solid state or rotating drives, random-access memory ("RAM"), and other components. In the preferred embodiment, the central database 110 may also comprise web servers, load balancers, and other components to facilitate access to the data therein. In some embodiments, one or more components, particularly the engine 703, may comprise specialized hardware for performing high volumes of computational tasks relevant to the method, such as the various bitwise algorithms described below. The central database 110 preferably includes the enterprise app 701, the data store 102, which preferably includes the capabilities/constraints database 112, and the engine 703.

Figure 8:
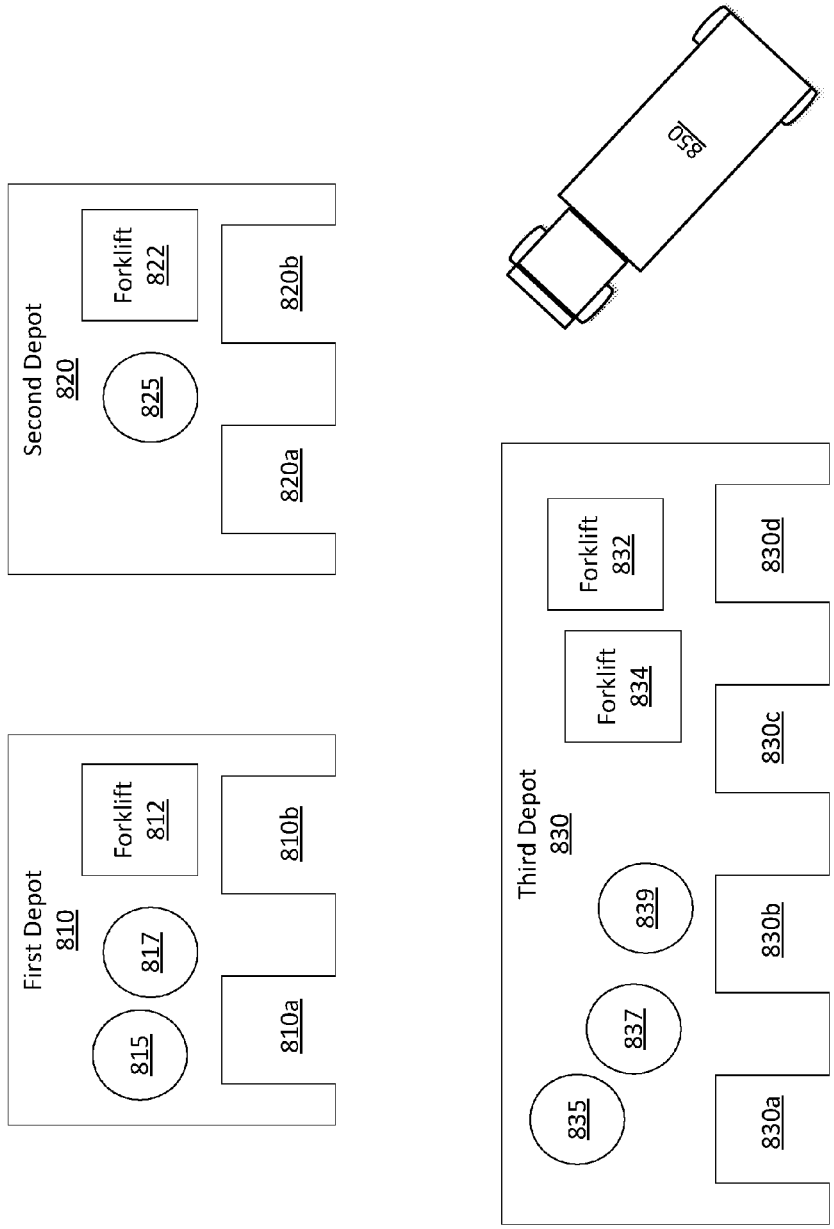
FIG. 8 is an illustration of a shipping environment for use in discussion of the operation of the present system 100 and methods of FIG. 1.

FIG. 8 is an illustration of a shipping environment for use in discussion of the operation of the present system 100 and methods. The illustration is merely an example to illuminate discussion of the present system 100 and methods and is not intended to limit the scope of the preferred invention. It is to be understood that while small numbers of each resource are shown in the example and few resource constraints exist between them, the present system 100 is adapted to handle situations with hundreds or thousands of resources with tens, hundreds, or even thousands of interrelated constraints. The constraints are preferably provided to the central database 110 by the trading partners 11, 12, 13 or may be generated by the system 100.

In a preferred example of FIG. 8, three depots 810, 820, 830 are located at various geographic locations. Each depot 810, 820, 830 comprises a number of loading points or loading docks 810*a-b*, 820*a-b*, 830*a-d* for accepting a shipping vehicle such as a truck 850. As a non-limiting example, first depot staff members 815, 817 work at a first depot 810, a second depot staff member 825 works at a second depot 820 and third depot staff members 835, 837, 839 work at a third depot 830. A first forklift 812 is present at the first depot 810, a second forklift 822 is present at the second depot 820 and third and fourth forklifts 832, 834 are present at the third depot 830. In the present preferred example, the depot staff members 815, 817, 825, 835, 837, 839 and the forklifts 312, 322, 332, 334 are shared as needed amongst the depots 810, 820, 830. The depot staff members 815, 817, 825, 835, 837, 839 and the forklifts 312, 322, 332, 334 are not limited to being associated with only one of the depots 810, 820, 830, but may be constrained to particular depots 810, 820, 830, times, locations, conditions or otherwise, depending only on operational and user preferences.

In the present preferred example, the carrier operating truck 850, which is preferably associated with one of the trading partners 10, 11, 12, is to pick up an order from a supplier, who is also preferably one of the trading partners 11, 12, 13, operating the first, second and third depots 810, 820, 830. The supplier, which is preferably another of the trading partners 11, 12, 13, will generally require the carrier or third party trading partner 10, 11, 12 to set an appointment for the pickup or drop-off, to ensure that the carrier arrives at a time when one or more of the first, second and third loading depots 810, 820, 830 is available with needed equipment and staff, such as the forklifts 812, 822, 832, 834 and the depot staff members 815, 817, 825, 835, 837, 839. The appointment will also have to be scheduled at a time when at least one or an appropriate number of loading points or loading docks 810*a-b*, 820*a-b*, 830*a-d* are available for the appointment.

The supplier or trading partner 11, 12, 13 may provide a system for making appointments, such as a web site accessible by the carrier 850, who is another of the trading partners 10, 11, 12. The carrier 850 may have preferences with regard to location and time of pickup. The supplier 11, 12, 13 may only have the needed product available at a subset of the depots 810, 820, 830. Furthermore, other resources, such as personnel and equipment may only be available at certain times at various depots 810, 820, 830. Additionally, loading points 810*a-b*, 820*a-b*, 830*a-d* and other resources may not be available at certain times due to other activities, such as existing appointment reservations or expected breaks, vacations, maintenance, or outages. The result is that a large number of constraints may be placed on the scheduling of the appointment, making determination of available appointment times for selection a complicated task, particularly considering the individual appointment may be only one of a series of necessary appointments required to ship the product from the first trading partner 11 to the second trading partner 12. In a preferred embodiment, a core portion of the system 100 provides an application programming interface (API) that can be made available to a variety of software clients, such as web sites, mobile device applications, and other enterprise systems such as enterprise resource planning ("ERP") and supply chain management ("SCM") systems.

In the preferred example, the role of the system 100 is to receive information about constraints associated with the task to be performed, such as a pick-up or drop-off, combine that information with information regarding the interrelated constraints associated with the loading points 810*a-b*, 820*a-b*, 830*a-d*, and provide information back to the trading partner 11, 12, 13 regarding viable appointment timeslots for at least a subset of those loading points 810*a-b*, 820*a-b*, 830*a-d*.

Figure 9:
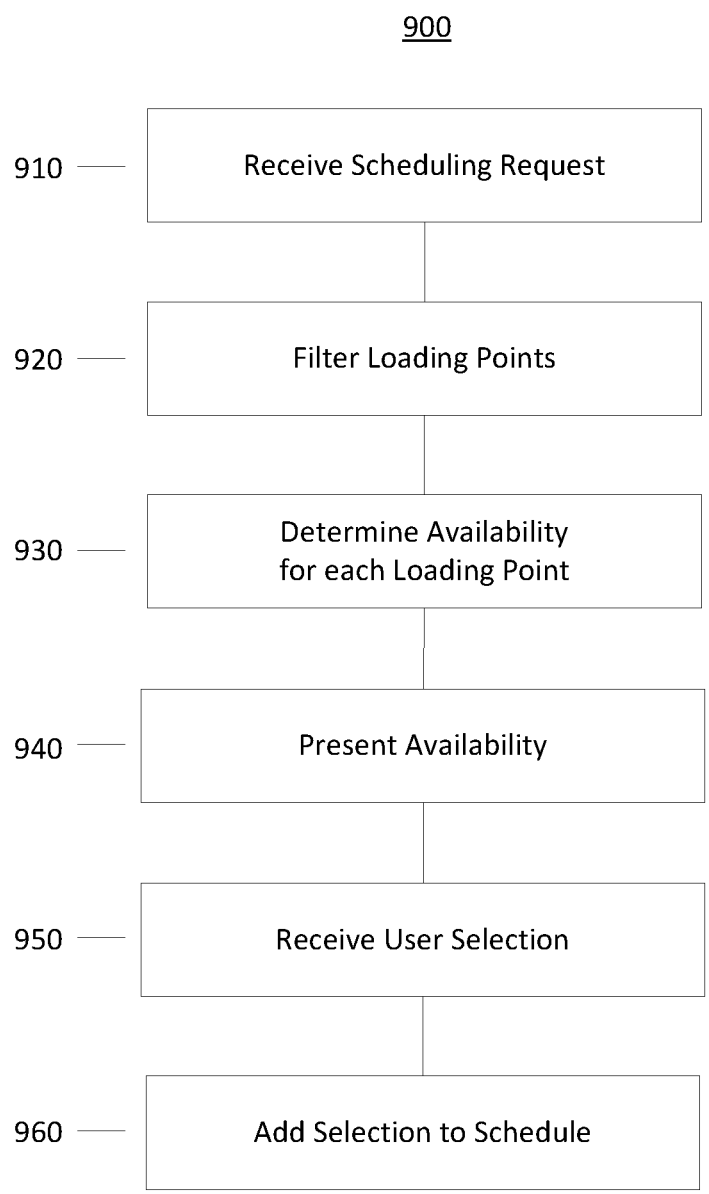
FIG. 9 is an illustration of a high-level process 900 for determining the viable timeslots for resources such as the loading point in the supply chain system of FIG. 1.

FIG. 9 is an illustration of a high-level process 900 for determining the viable timeslots for resources such as the loading points 810*a-b*, 820*a-b*, 830*a-d*. While the process is described with respect to assessment of availability of the loading points 810*a-b*, 820*a-b*, 830*a-d* for clarity of description, the process may also be applied to other top-level resources such as medical facilities, conference facilities, recreational facilities, transportation resources, or other resources with variable availability or other constraints, such as equipment constraints, personnel constraints, set-up constraints, clean-up constraints and related constraints.

At 910, the system receives a scheduling request from one of the trading partners 10, 11, 12, such as a carrier. The scheduling request may be, for instance, for a pickup or a drop-off of a shipment of goods at the facility associated with the first, second and third depots 810, 820, 830.

At 920, initial filtering is performed on the top-level resource to be scheduled, such as the loading points 810*a-b*, 820*a-b*, 830*a-d* of the depots 810, 820, 830. The filtering may be based upon any number of factors such as geographic location, product availability, or ability to accommodate a desired mode of shipping. It is to be understood that filtering may also effectively be performed at the following step using availability constraints. The processing may, however, be more efficient in some cases if an initial filtering is performed using other methods, such as those that operate directly in the domain in which the constraints are stored, such as calendar time or geographic distance.

At 930, the availability of each top-level resource, such as each of the loading points 810*a-b*, 820*a-b*, 830*a-d* meeting the filter criteria of the initial filtering process 420, is determined. The availability is determined using a binary temporal constraint mask combination technique described further below with respect to FIGS. 10-13.

The preferred methods of the present invention may be considered as an instance of the general MapReduce programming model. Various Map procedures are preferably used to convert information relevant to constraints related to the appointment to be scheduled and related to the resources into a set of binary temporal constraint masks related to those constraints.

The mapping from constraints to binary temporal constraint masks may or may not be a one-to-one relationship, depending on the nature of the constraints. In some cases, certain real-world constraints may cause other constraints to be used or not used and not themselves map directly to binary temporal constraint masks. Furthermore, even those constraints that are temporal in nature, such as business hours or times of other appointments, may not directly map to the same time intervals in the corresponding binary temporal constraint masks due to interactions amongst constraints, as will be described below.

The Reduce procedure performs the summary operation of combining the binary temporal constraint masks related to the constraints into an availability mask for each top-level resource, such as a loading point 810*a-b*, 820*a-b*, 830*a-d*, being considered for use in the appointment to be scheduled.

At 940, the availability of appointments for various loading points 810*a-b*, 820*a-b*, 830*a-d* are presented to the requesting trading partner 10, 11, 12. The availabilities are preferably presented in terms of real calendar and clock time. In a preferred embodiment, availability is presented visually with loading points 810*a-b*, 820*a-b*, 830*a-d* presented as columns and time slots represented as rows, with available appointments indicated at appropriate row-column intersections.

At 950, a selection of a particular appointment time for a particular loading point 810*a-b*, 820*a-b*, 830*a-d* is received from the trading partner 10, 11, 12. In a preferred embodiment, the selection is made via user selection of an appointment presented at 940. The selection is translated by the preferred system 100 from the user-preferred format into the preferred format of the system 100 for manipulation.

At 960, the appointment is added to the schedule. Additionally, the availability data for each resource impacted by the appointment, such as the loading point 810*a-b*, 820*a-b*, 830*a-d* itself, the depot staff members 815, 817, 825, 835, 837, 839, product, and equipment, such as the forklifts 812, 822, 832, 834, will be adjusted to account for the expected usage during the newly scheduled appointment. Thus, the newly scheduled appointment will be accounted for as subsequent appointments are scheduled.

Figure 10:
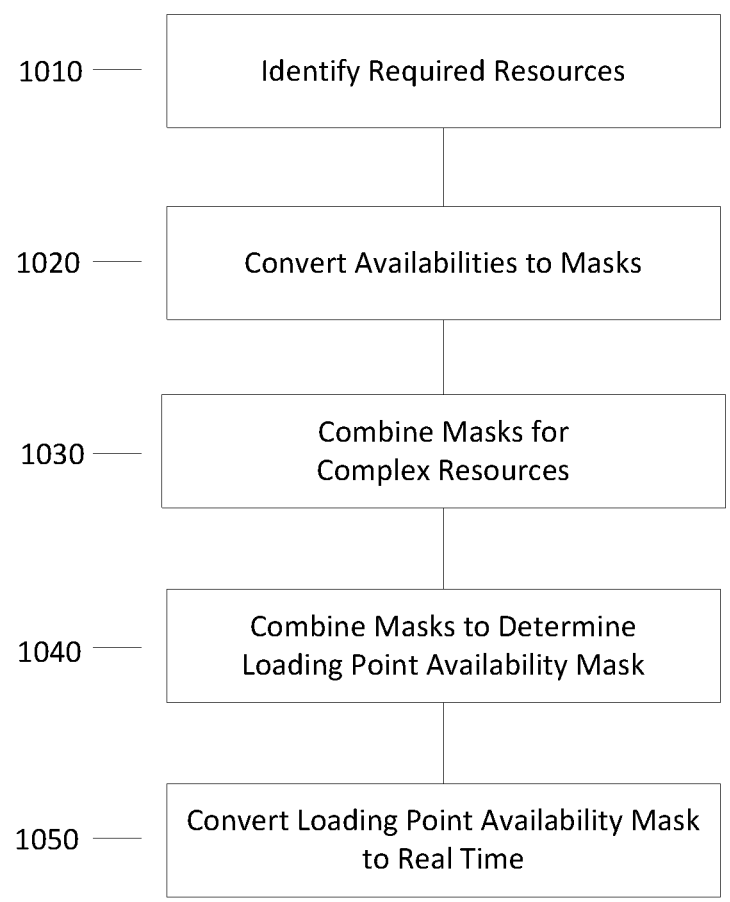
FIG. 10 is a flow chart of an exemplary process 1000 for determining the availability of a particular top-level resource, such as the loading points in the supply chain system of FIG. 1.

FIG. 10 is a flow chart of an exemplary process 1000 for determining the availability of a particular top-level resource, such as the loading points 810*a-b*, 820*a-b*, 830*a-d*. The process 1000 may be performed, for instance, at 930 of the process of 900 for each loading point 810*a-b*, 820*a-b*, 830*a-d* meeting the criteria of the filtering of 920. It is to be understood that while the steps are described in a particular order, some steps may be performed in other orders or in parallel. As with the process above, while the process is described with respect to assessment of availability of loading points 810*a-b*, 820*a-b*, 830*a-d*, the process may also be applied to other top-level resources such as medical facilities, conference facilities, recreational facilities, transportation resources, or other resources with variable availability.

At 1010, the supplemental resources required for use of the top-level resource for the required task are identified. For instance, for transfer of pallets, one or more of the forklifts 812, 822, 832, 834 may be required. For transfer of liquid chemicals, certain pump, storage and clean-up equipment may be required. Certain of the staff 815, 817, 825, 835, 837, 839 may be required at various times before, during, and after the appointment to be scheduled, sometimes in variable numbers.

In some cases, top-level resources may be filtered from consideration prior to the process 1000, perhaps at 920, based on availability of some key equipment. In other cases, a determined resource mask related to the particular loading point 810*a-b*, 820*a-b*, 830*a-d* will cause the top-level resource to appear unavailable.

At 1020, the availabilities of resources associated with the top-level resource are converted to masks. For instance, the availability of operators or other staff 815, 817, 825, 835, 837, 839 associated with the loading point 810*a-b*, 820*a-b*, 830*a-d*, expected outages of product, availability of equipment, and existing reservations, may each be converted from various real-time formats to binary temporal constraint masks. As described earlier, the masks may have arbitrary duration and granularity. In one embodiment, twenty-four (24) hour durations are used in cases where the relevant time windows are within a single day, and two or more twenty-four (24) hour durations are combined in cases where an appointment or associated constraints may span timeslots belonging to multiple days.

At 1030, masks for individual resources of a particular type may be combined to produce a composite resource mask. For instance, if use of one of the loading points 810*a-b*, 820*a-b*, 830*a-d* requires two operators of the staff 815, 817, 825, 835, 837, 829, but not specific operators, the masks for all potentially available staff members 815, 817, 825, 835, 837, 829 may be combined in such a way as to produce a composite operator resource mask that indicates times when at least two operators or staff 815, 817, 825, 835, 837, 829 are available. In more complex cases, the individual availabilities of the operators are combined and then thresholded against a time-variable set of values, such that the resulting mask indicates whether sufficient staff 815, 817, 825, 835, 837, 829 would be present at all relevant times before, during, and after the appointment, if the appointment were to begin at the time slot at issue. Examples of this process are described in further detail with respect to FIG. 11 below.

At 1040, the availability masks associated with a loading points 810*a-b*, 820*a-b*, 830*a-d* are combined to produce the loading point availability mask. In a preferred embodiment, this combination is effectively performed as a series of bitwise AND operations. That is, the loading point(s) 810*a-b*, 820*a-b*, 830*a-d* in question is indicated as available for an appointment starting at a particular time slot if each and every one of the component availability masks has an indication of availability for that time slot.

It is to be understood that while this final combination of masks is preferably an AND operation, other bitwise operations, such as OR, XOR, NOT, NAND, or NOR may be used as needed to reflect the relationships amongst the constraints. For instance, masks of resources that are substitutes for each other may, in some embodiments, be maintained as separate masks up through the final combination step. The engine performing the combination may apply an "OR" to those masks to determine availability of at least one of the resources for scheduling viability, but still maintain the individual masks such that a choice amongst substitutable resources at a selected appointment time may be presented to the user based upon the information contained in the individual resource masks. In one preferred embodiment of the system 100, an "overlap" mask may be created to indicate those timeslots for which a choice amongst the substitutable resources is available. If an appointment slot is chosen corresponding to a timeslot with a positive indication in the overlap mask, processes may be invoked for providing the opportunity to select amongst those resources. Similarly, more complex logical and arithmetic operations may be used to compute the individual component masks, such as at 1030, particularly for multi-resource requirements such as staffing.

At 1050, the loading point availability mask is converted back to actual time values or intervals. In some preferred embodiments, this may entail applying an inverse transform of that applied to convert real-time availability data to the binary temporal constraint mask domain. This facilitates presentation of the availability in a format meaningful to the trading partner 10, 11, 12.

Again, it is to be understood that some of the steps of process 1000 may be performed in other orders or in parallel. For instance, step 1030, the combining of masks for complex resources, may be performed as part of step 1020. The process 1000 may further be performed in parallel by a number of processors for a large number of loading points and constraints.

In the preferred embodiment, individual constraints or sets of constraints may be stored in any form. However, to perform the assessment of viability of timeslots for the desired task, the constraints are processed to create binary temporal constraint masks. In the preferred embodiment, the temporal constraint mask for each constraint is a binary mask, with each binary digit representing whether or not that constraint makes scheduling a timeslot starting at that time viable or unviable. As will be described below, the constraints that impact assessment of viability of timeslots and the transformation of those constraints to binary temporal constraint masks may both be affected by aspects of the appointment to be scheduled.

In this simplified example, the activity to be scheduled uses durations equal to the time interval represented by a single binary digit, in this case, an hour (1 hr.). The processes described herein, however, are general and applicable to tasks that span arbitrary time intervals and the masks may similarly have arbitrary granularity.

FIG. 11 is an illustration of the process of determining the availability mask for a top-level resource such as a loading point. A plurality of binary temporal constraint masks 1110, 1120, 1130 span time intervals 1105. In the present example, one-hour (1 hr.) time intervals are used. The binary temporal constraint masks are combined using logical AND operations to produce an overall availability mask 1190 for a loading point, such as one of the loading points 810*a*-*b*, 820*a*-*b*, 830*a*-*d*.

In the present simplified example, individual binary temporal constraint masks related to three individual or compound constraints are combined. The first is a loading point reservation mask 1110. In this example, the loading point reservation mask 1110 indicates that reservations would cause unviability of appointments starting at nine (9) AM, ten (10) AM, eleven (11) AM, twelve (12) PM or two (2) PM. It is not necessarily the case that specific reservations are made for each of these times. The mask indicates, however, that for some reason, the constraints related to reservations make beginning an appointment of the nature of the appointment being scheduled not viable to begin at that time slot.

Similarly, staffing mask 1120 indicates whether staffing-related constraints make beginning an appointment during a particular time slot viable or not viable. In the case of simple staffing constraints for an appointment lasting less than the duration of a time interval, the mask may be a one-to-one indication of whether one or more of the staffers 815, 817, 825, 835, 837, 839 is available at the loading point 810*a*-*b*, 820*a*-*b*, 830*a*-*d*. In other cases, each bit may indicate whether a sufficient, and potentially variable number of the staff members 815, 817, 825, 835, 837, 839 are available for periods of time extending before, during, and after the appointment, if the appointment were to start during that time interval. Creation of a binary temporal constraint mask related to staffing constraints will be discussed further with respect to FIG. 13. In still other cases, each bit may indicate whether the expected capacity or remaining capacity of a resource, such as storage area or volume, is sufficient for the expected need during one or more timeslots if the appointment is scheduled to start at a given timeslot.

Outage Mask 1130 indicates whether constraints related to product outages make starting an appointment of the type being schedule viable or unviable. Many other masks may be generated to represent additional constraints. The preferred constraints and masks shown here are merely exemplary.

In a preferred embodiment, while more complicated transforms may be used to create each individual binary temporal constraint mask, the combined availability mask for the loading point(s) 810*a*-*b*, 820*a*-*b*, 830*a*-*d* is created using logical AND operations, combining all of the component binary temporal constraint masks into a single mask indicating those time slots for which all of the component masks indicated viability. That is, the combined mask 1190 provides an indication of whether all constraints are met for a particular time slot, thereby making an appointment starting at that time viable. In the present example, Nine (9) AM, ten (10) AM, and two (2) PM are determined as viable start times for the specific type of appointment at this particular loading point.

It is notable that in the preferred embodiment, the combination engine 703 may operate with no particular knowledge of the relationship of the masks to real time, either in extent or interval size. Since all constraints will have been converted to the same binary temporal constraint mask domain, they may be combined without this knowledge.

Figure 12:
FIG. 12 is an illustration of the dependence of the binary temporal constraint mask on task length in the supply chain system of FIG. 1.

FIG. 12 is an illustration of the dependence of the binary temporal constraint mask on task length. The temporal constraint mask computed at 1020 for a resource will often vary based upon the duration of the task to be performed that will utilize the resource. If a task takes more than one binary temporal mask time interval, multiple consecutive time intervals will need to be available for that resource for that time interval to be marked as a viable start time in the resulting mask.

The time required for a task may be computed in a number of ways. In some cases, the required time may be a constant. In others, the duration may be dependent upon a quantity associated with the appointment, such as the quantity of goods to be transferred. In some cases, the time may rise as a step function. For instance, if each pallet requires a certain amount of time for loading, the number of pallets required may determine the time rather than the exact quantity.

In the illustrated example 1200, time 1205 is preferably broken into one-hour segments. The real time availability 1208 for a particular resource comprises the time intervals from eight (8) AM through noon, a five-hour span, as well as the two (2) PM to three (3) PM intervals, a two-hour span.

If the task for which the binary temporal constraint mask is to be computed consumes one hour, the resulting binary temporal constraint mask for the resource would indicate availability at each increment for which there is availability indicated in the real time availability 1208. If the task requires one hour and the time increments are an hour, any time at which the resource is available will be indicated as a viable start time for the appointment with respect to that resource in the mask 1210.

If the task for which the binary temporal constraint mask is to be computed consumes two hours, the resulting binary temporal constraint mask 1220 for the resource would indicate availability at each increment for which there is availability indicated in the real time availability 1208 for both that hour and the next hour, as shown in mask 1220.

If the task for which the binary temporal constraint mask is to be computed consumes four hours, the resulting binary temporal constraint mask 1240 for the resource would indicate availability as a starting time at each increment for which there is availability indicated in the real time availability 1208 for both that hour and the next three hours.

It is to be understood that this is a simplified example for purposes of illustration. A preferred embodiment of the system 100 is adapted to facilitate use of business logic for many types of constraints, some interrelated. A common attribute of each constraint conversion process, however, is to represent the constraint or combination of constraints in a common domain in which a positive value at a particular bit position indicates that the constraints do not prevent an appointment beginning at the time represented by that position, and a negative value indicates that the constraints do prevent an appointment beginning at that time.

FIG. 13 is an illustration of the calculation of a mask of timeslot availability based upon staff availability. In many cases, more than one of a certain type of resource, such as staff or equipment, may be required for a task. For instance, in a very simple case, a task may need to be staffed by two human operators or staff members 815, 817, 825, 835, 837, 839.

In the present example, across the time intervals 1305, three staff members of the staff members 815, 817, 825, 835, 837, 839 have individual availability masks 1310, 1320, 1330. In this preferred example, the task requires two staff members of the plurality of staff members 815, 817, 825, 835, 837, 839 for the time period to be viable. The task in this case is assumed, for simplicity of explanation, to require a single time interval.

The overall staffing mask 1390, therefore, indicates viability of a starting time for all time periods for which at least two of the individual staff masks 1310, 1320, 1330 indicate availability. Computationally, this operation may be performed, for instance, as a bitwise summing and thresholding. That is, if the bit values for a particular time interval are summed across a time slot for all instances of the fungible resource and the result meets or exceeds the threshold, that bit position may be noted as a positive value in the composite mask for that fungible resource.

In some instances, the level of staffing of the loading point, for example, the loading points 810a-b, 820a-b, 830a-d, required for viability of a timeslot will not be constant. For instance, additional staff members 815, 817, 825, 835, 837, 839 may be needed before or at the time of arrival of the carrier 850, but not during the majority of the loading time itself. In this case, a sliding set of adjustment values may be applied to the bitwise sums. The sliding set of adjustment values may extend before and after the appointment window. For instance, if three operators of the staff members 815, 817, 825, 835, 837, 839 are required for an hour before an appointment to prepare one of the loading points 810a-b, 820a-b, 830a-d, but only one operator or staff member 815, 817, 825, 835, 837, 839 is required during the appointment window, a sliding set of adjustment values of "2000," with the second position corresponding to the start time, may be used to adjust the bitwise sums. Alternatively, both the general threshold (e.g., the staffing offset and the variability) may be encoded in the same threshold string.

In essence, the mapping process from constraints and rules to binary temporal constraint masks simplifies the information to answer the question, "are there are enough people at all relevant times to start an appointment at this time?" Thus, multiple bitwise addition and threshold operations may need to be performed at a variety of other time interval bit positions to determine each individual value of the composite resource mask. The bit position of the composite resource mask only being set to a positive value if all of the individual sums meet their respective thresholds.

A similar process may be utilized for resources having fixed or variable capacity, such as storage areas or storage tanks. The expected available capacity of each resource at each timeslot may be represented by, for instance, an integer value. The required storage capacity at a given time or set of times may be compared with the expected available capacity for a single resource or the aggregate available capacity of a set of resources, to determine a binary temporal availability mask for the required storage resource.

Many other types of constraints may be applied using the system in addition to those described above. In some cases, a shipper 850 or other third party trading partner 10, 11, 12 may need to make an appointment for pick-up or drop-off of multiple products or a product or shipment comprising multiple components. In such a case, the availability of each loading point 810a-b, 820a-b, 830a-d for each individual product or component may be computed as described above. The resulting availability masks for each product in the set of products may then be combined using bitwise AND to determine availability for the multi-product appointment.

Another type of constraint that may impact the determination of available appointment times is a reservation. In a preferred embodiment of the system, certain time periods for certain loading points 810a-b, 820a-b, 830a-d may be allocated ahead of scheduling of appointments to certain carriers. The system will first attempt to find appointments during the times reserved for the carrier 850 or other third party trading partner 10, 11, 12. If no times are available within the reserved time period, the system may then expand the results to include times outside the reserved times.

The system 100 may use, for example, one of two mechanisms to achieve this result. First, the system 100 may apply the reservation periods for each loading point as a constraint. The binary temporal constraint mask for the reservation would be combined with the other constraints at

1040 and impact the resulting availability mask for the loading point 810*a-b*, 820*a-b*, 830*a-d*. The disadvantage of this approach, however, is that if no viable appointments remain with the reservation constraints applied, the process would need to be executed a second time without the reservation constraints. Thus, a second method may be used in which the availability for each loading point 810*a-b*, 820*a-b*, 830*a-d* is computed without using reservations as a constraint, with the reservation periods applied as a filter before display of the results after computation of the availability mask.

In a preferred embodiment, reservations may be "cleared" if the remaining time until the reserved period is below a certain threshold. That is, if the intended carrier 850 or third party trading partner 10, 11, 12 has not utilized the reservation, the time slot may be opened to other carriers 850 or third party trading partner 10, 11, 12. This may be implemented as an adjustment to a constraint or to a filter.

Appointment slots may be frozen at a certain time, such as a number of hours before the appointment slot or, for instance, a certain time of the day before the appointment slot. The "frozen" time may vary based upon whether the user is related to a carrier, subcarrier, shipper, or other role of one of the trading partners 10, 11, 12.

In a preferred embodiment, negative reservations may also be configured. That is, certain time slots may be reserved for all but the carrier 850 associated with the negative reservation. Negative reservations, like positive reservations, may be implemented either via binary temporal constraint masks or as filters.

In a preferred embodiment, the system schedules based on twenty-four (24) hour periods. That is, each constraint is converted to a binary temporal constraint mask spanning a twenty-four (24) hour period at whatever temporal granularity is in use. For instance, with hourly granularity, each mask would be represented by a twenty-four (24) bit sequence. For minute-level granularity, each mask would be represented by a one thousand four hundred forty (1440) bit sequence. While arbitrary lengths could be used, particularly lengths based on a temporal filter such as a desired window for the appointment, standardizing the corresponding real-time length of the binary temporal constraint masks can simplify the program code. Results, however, are generally filtered such that less than the entire twenty-four (24) hour-period is presented to the user, based on factors such as the period during which appointment availability was queried, user interface configuration, user preferences, or other factors.

The system is not limited to scheduling within a one-day period and may be otherwise configured and arranged. Appointments that span more than a day or appointments that cross midnight between days may also be scheduled. In the preferred embodiment, however, the twenty-four (24) hour periods on each side of each day threshold would be assessed separately, with the results combined for presentation.

The system 100 preferably comprises user interfaces for setting and viewing preferences related to appointment viability determinations. Preferences may include, for instance, settings for the time interval to be used, reservations, negative reservations, staffing, outages, calculation methods for durations (e.g., fixed, quantity based, step function), calculation methods for staffing requirements, pre-appointment resource requirements, business hours, holidays, preferred carriers 850 or third party trading partner 10, 11, 12 and other factors that may impact scheduling.

The system 100 may also provide the ability to configure times at which various parties may schedule appointments. For instance, in a preferred embodiment, carriers 850, who is one of the trading partners 10, 11, 12, may be provided the ability to book appointments only up to three days ahead, whereas shippers 850, who is also one of the trading partners 10, 11, 12, may be allowed to book at any time. Further constraints may be set for sub-carriers, who are also, but not necessarily, one of the trading partners 10, 11, 12. The system 100 may also provide the ability to freeze the ability to make appointments for imminent time periods, such as the next day, at a particular time. Whether the user account is associated with a shipper, carrier, subcarrier or other trading partner 10, 11, 12 may be considered as a constraint by the system 100, impacting the number and content of the binary temporal constrain masks. The type of users or trading partners 10, 11, 12 may, therefore, cause other constraints to be applied.

In a preferred embodiment, the system 100 provides the ability for the trading partners 10, 11, 12 to search for times at which an already scheduled shipment may be rescheduled. While this could be accomplished by canceling the existing appointment and performing a new search, that approach risks the current appointment slot being booked by another trading partner 10, 11, 12 or the system 100 preventing rebooking of the same appointment based on other constraints. In order to accurately perform this task without risking loss of the present appointment, the system 100 accounts for those resources marked for expected use by the presently scheduled appointment in calculating availability of other appointments. This may be accomplished in a variety of ways, such as adding the staff to be used by the current appointment to the remaining staffing counts, reversing the availability of resources used by appointment to be rescheduled, such as the loading point or equipment before combination of the temporal masks, etc. In essence, availability of other appointment slots is calculated as if the currently scheduled appointment was canceled, but without performing the cancellation until after a new appointment time is selected.

The system 100 is preferably integrated with enterprise resource planning ("ERP") or supply chain management ("SCM") software. Shippers, carriers and other trading partners 10, 11, 12 may automatically receive notification of shipments to be scheduled, preferably including links to bring the user or other trading partners 10, 11, 12 to an interface to determine available appointment times.

Since the binary temporal constraint masks for a constraint may depend on aspects of a shipment that are not known ahead of time, a preferred embodiment of the system 100 generates the binary temporal constraint masks on-the-fly once details of the appointment to be scheduled are known. Constraints may be stored in disparate formats, though many may be stored as time intervals in normal time format, along with associated rules. For instance, availability of a particular staff member of the staff members 815, 817, 825, 835, 837, 839 may be stored as start and end times of portions of a work shift. Rules, however, would specify that the staff member 815, 817, 825, 835, 837, 839 is needed fifteen minutes (15 min.) prior to the start time of an appointment for the appointment to be viable, which may cause the binary temporal constraint mask to deviate from a simple mapping of the time intervals to the binary temporal constraint mask domain.

By applying the described methods, appointments involving far more complex combinations of constraints may be determined in real time. While a conventional constraint satisfaction problem ("CSP") approach may test essentially every permutation of resources to locate one solution, the present methods simultaneously provide an indication of all of the appointment times that are viable solutions. While the time required for the CSP approach may grow exponentially as constraints are added, the time required for the present methods grows essentially linearly.

Figure 14B:
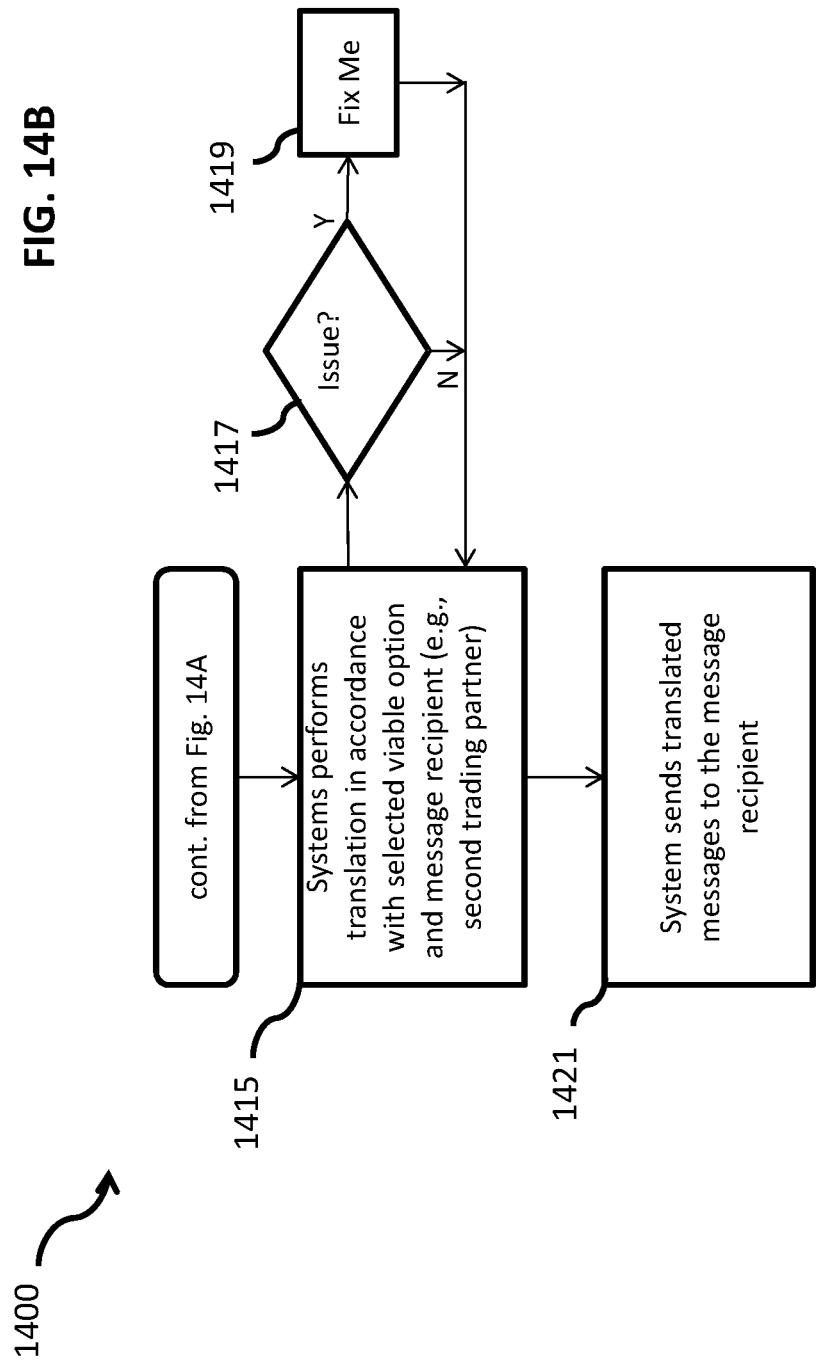

FIGS. 14A and 14B is a flow chart of a method 1400 for improved efficiency of translation of a business message through the preferred supply chain system 100. Referring particularly to FIG. 14A, at 1401, the first trading partner 10 sends a business message, which may include one of more constraints on a plurality of resources. The plurality of constraints may include a plurality of temporal constraints and a plurality of qualitative constraints. At 1403, the system (such as, for example, the above discussed message translation system 100), may translate the business message, which may include business rationalization of the messages, as described in connection with FIG. 5 above.

In connection with the translation of the business message, at 1404 a check is performed if there is any issue or problem with the translation. If an issue arises, a resolution may be determined. Such a resolution may be determined at 1405, which may take the form of a Fix-Me 109 process as described above in connection with FIG. 6. It should be noted, however, that other issue resolution strategies described hereinthroughout may be employed in keeping with the spirit of the invention.

Upon translation of the business message, at 1406, the optimization engine receives the translated business message (for example, in the instance that the business message includes the above discussed constraints). It should be noted that other trading partners 10, 11, 12 may also send messages to the optimization engine as well. For example, at 1407, the second trading partner 11 may send business messages including capabilities to the optimization engine. Also, at 1409, another trading partner 10, 11, 12 may send business messages, which may include other constraints. It should be noted that the interaction of other parties with the optimization engine may include interaction with the supply chain system 100 as well, for example, in the instance that messages may need to be processed, or otherwise translated prior to reception by the optimization engine.

At 1411, the optimization engine, processes the translated messages including constraints for a given request (such as, for example, by the first trading partner 10). Processing by the optimization engine may take the form of the processes as described in connection with FIGS. 7-13.

Upon completion, at 1413, the optimization engine may display viable options to the first trading partner 10. Such viable options may relate to viable solutions to a constrained event requested by the first trading partner 10. Referring now to FIG. 14B (continued from 14A), upon selection of a viable option by the first trading partner 10, at 1415, the translation system 100 may perform a translation of the selected option. The translation may take into consideration various aspects of the selected option. For example, the system 100 may translate in accordance with information regarding the sender (the first trading partner 10) of the message, information regarding a recipient of the message (another trading partner 10, 11, 12), and information regarding the message type.

In connection with the translation of the message, at 1417 a check is performed if there is any issue or problem with the translation. If an issue arises, a resolution may be determined. Such a resolution may be determined at 1419, which may take the form of a Fix-Me 109 process as described above in connection with FIG. 6. It should be noted, however, that other issue resolution strategies described hereinthroughout may be employed in keeping with the spirit of the invention. Upon translation, at 1421, the supply chain system 100 may send one or more portions of the translated message to the trading partner 10, 11, 12 identified in the message.

In practice, the above techniques have been shown to produce results in seconds in situations where constraint satisfaction problem techniques require hours. Thus, the described methods provide not only a vastly improved user experience, but also cost savings in terms of computing hardware and operation.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the present disclosure.

We claim:

1. A method for improved efficiency of translation of a business message through a message translation system in a supply chain system, the method comprising:

(a) receiving, by a computing system of the message translation system, a business message including respective constraints on a plurality of resources, wherein the plurality of constraints includes a plurality of temporal constraints and a plurality of qualitative constraints, the plurality of qualitative constraints selected from the group consisting of a product to be shipped, a quantity of product to be shipped, a loading point, storage capacity, goods, volumes, preferences, prices, requirements to combine shipments, requirements related to the type of party, combined shipments, type of party, fixed calculations, price, quantity-based calculations including step-functions, a large slot than shipment, availability of goods, product outages, product groups, a type of event of a trading partner, a same shipment constraint, a generated qualitative constraint from the computing system, pick-up location, drop-off location, a product grouping, a first medical facility, a first conference facility, a first recreational facility, a first transportation resource, equipment, personnel, set-up, clean-up, a desired task, a type of an appointment, nature of an appointment, staffing, a staff member, a storage area, a storage volume, a capacity of a resource, a quantity of staff, availability of staff before an appointment, availability of staff after an appointment, pick-up of multiple products, drop-off of multiple products, shipment of multiple components, a third party trading partner, a shipper, a carrier, a sub-carrier, a trading partner, a type of trading partner and other qualitative constraints, the plurality of temporal constraints selected from the group consisting of a time required for a pickup, a time required for a delivery, a time for an appointment, storage availability, loading point availability, product availability, business hours, staff availability, time required for completing tasks, distribution of time required for completing tasks, operating times, a time, appointment times, potential appointment timeframes, fixed time calculation, potential appointment timeframes spanning at least one day, potential appointment timeframes spanning at least two days, loading point hours of operation, block time, availability of goods, previous appointments, intervals, fixed durations, variable durations, reservations, negative reservations, release times, times, preferences, subcarrier release times, frozen time, subcarrier frozen times, timeframes, a generated temporal constraint from the computing system, pick-up time, drop-off time, a timeslot, a freeze of appointments and other temporal constraints;

(b) processing the plurality of constraints, by a processor of a message translation system, into a format for use with the computing system;

(c) expanding a first qualitative constraint of the plurality of qualitative constraints into an expanded temporal constraint on a first resource of the plurality of resources meeting one or more quality levels associated with the plurality of qualitative constraints;

(d) translating, by the computing system, the plurality of temporal constraints and the expanded temporal constraint into respective sets of binary temporal constraints;

(e) combining, by the computing system, each of the respective sets of the binary temporal constraints into combined respective binary temporal constraints, wherein combining the respective sets of binary temporal constraints into combined respective binary temporal constraints includes applying one or more bit-wise Boolean operations to the respective sets of binary temporal constraints;

(f) combining, by the computing system, the combined respective binary temporal constraints into a single overall binary temporal schedule, wherein combining the combined respective binary temporal constraints includes applying one or more bit-wise Boolean operations to the combined respective binary temporal constraints;

(g) translating, by the computing system, the single overall binary temporal schedule into a non-binary temporal schedule;

(h) displaying to a user, one or more viable scheduling alternatives from the non-binary temporal schedule; and (i) performing a subsequent run of steps (a)-(h) independent of a previous run of steps (a)-(h) without knowledge of the previous run.

2. The method of claim 1, further comprising:
upon reception of one of the viable scheduling alternatives; sending information to the recipient.

3. The method of claim 1, wherein steps (a)-(h) are repeated in a subsequent run.

4. The method of claim 3, wherein the subsequent run is performed without knowledge of an initial run.

5. The method of claim 1, wherein the combined respective binary temporal constraints are single respective binary temporal constraints.

6. The method of claim 1, wherein the business message includes one of a purchase order, a purchase order acknowledgement, an advance shipping notice, or an invoice.

7. A method for improved efficiency of translation of a business message through a message translation system in a supply chain system, the method comprising:

(a) receiving, by a computing system of the message translation system, a business message including respective constraints on a plurality of resources, wherein the plurality of constraints includes a plurality of temporal constraints and a plurality of qualitative constraints, the plurality of qualitative constraints selected from the group consisting of a product to be shipped, a quantity of product to be shipped, a loading point, storage capacity, goods, volumes, preferences, prices, requirements to combine shipments, requirements related to the type of party, combined shipments, type of party, fixed calculations, price, quantity-based calculations including step-functions, a large slot than shipment, availability of goods, product outages, product groups, a type of event of a trading partner, a same shipment constraint, a generated qualitative constraint from the computing system, pick-up location, drop-off location, a product grouping, a first medical facility, a first conference facility, a first recreational facility, a first transportation resource, equipment, personnel, set-up, clean-up, a desired task, a type of an appointment, nature of an appointment, staffing, a staff member, a storage area, a storage volume, a capacity of a resource, a quantity of staff, availability of staff before an appointment, availability of staff after an appointment, pick-up of multiple products, drop-off of multiple products, shipment of multiple components, a third party trading partner, a shipper, a carrier, a sub-carrier, a trading partner, a type of trading partner and other qualitative constraints, the plurality of temporal constraints selected from the group consisting of a time required for a pickup, a time required for a delivery, a time for an appointment, storage availability, loading point availability, product availability, business hours, staff availability, time required for completing tasks, distribution of time required for completing tasks, operating times, a time, appointment times, potential appointment timeframes, fixed time calculation, potential appointment timeframes spanning at least one day, potential appointment timeframes spanning at least two days, loading point hours of operation, block time, availability of goods, previous appointments, intervals, fixed durations, variable durations, reservations, negative reservations, release times, times, preferences, subcarrier release times, frozen time, subcarrier frozen times, timeframes, a generated temporal constraint from the computing system, pick-up time, drop-off time, a timeslot, a freeze of appointments and other temporal constraints;

(b) processing the plurality of constraints, by a processor of a message translation system, into a format for use with the computing system;

(c) expanding a first qualitative constraint of the plurality of qualitative constraints into an expanded temporal constraint on at least one of the plurality of resources meeting a quality level associated with the plurality of qualitative constraints;

(d) translating, by the computing system, the plurality of temporal constraints and the expanded temporal constraint into sets of binary temporal constraints;

(e) combining, by the computing system, each of the sets of the binary temporal constraints into respective single binary temporal constraints, wherein combining of the sets of binary temporal constraints includes applying one or more bit-wise Boolean operations to the respective sets of binary temporal constraints;

(f) in response to determining a variation of a resource requirement for viability of a timeslot associated with one of more of the sets of the binary temporal constraints, applying a sliding set of adjustment values to the one or more bit-wise Boolean operations of the one or more of the sets of the binary temporal constraints;

(g) combining, by the computing system, the combined respective binary temporal constraints into a single overall binary temporal schedule, wherein combining the combined respective binary temporal constraints includes applying one or more bit-wise Boolean operations to the combined respective binary temporal constraints to define a single overall binary temporal schedule;

(h) translating, by the computing system, the single overall binary temporal schedule into a non-binary temporal schedule;

(i) displaying to a user, a viable scheduling alternative from the non-binary temporal schedule;

(j) upon reception of one of the viable scheduling alternatives; sending information to the recipient; and (k) performing a subsequent run of steps (a)-(j) independent of a previous run of steps (a)-(j) without knowledge of the previous run.

8. The method of claim 7, wherein the combined respective binary temporal constraints are single respective binary temporal constraints.

9. The method of claim 7, wherein the business message includes one of a purchase order, a purchase order acknowledgement, an advance shipping notice, or an invoice.

10. The method of claim 7, wherein steps (e) and (g) include applying one or more bit-wise AND operations to one of the respective sets of binary temporal constraints and the combined respective binary temporal constraints.

11. A system for improved efficiency of translation of a business message through a message translation system in a supply chain system, the apparatus comprising:

a translation engine configured to:
receive a business message including respective constraints on a plurality of resources, wherein the plurality of constraints includes a plurality of temporal constraints and a plurality of qualitative constraints, the plurality of qualitative constraints selected from the group consisting of a product to be shipped, a quantity of product to be shipped, a loading point, storage capacity, goods, volumes, preferences, prices, requirements to combine shipments, requirements related to the type of party, combined shipments, type of party, fixed calculations, price, quantity-based calculations including step-functions, a large slot than shipment, availability of goods, product outages, product groups, a type of event of a trading partner, a same shipment constraint, a generated qualitative constraint from the computing system, pick-up location, drop-off location, a product grouping, a first medical facility, a first conference facility, a first recreational facility, a first transportation resource, equipment, personnel, set-up, clean-up, a desired task, a type of an appointment, nature of an appointment, staffing, a staff member, a storage area, a storage volume, a capacity of a resource, a quantity of staff, availability of staff before an appointment, availability of staff after an appointment, pick-up of multiple products, drop-off of multiple products, shipment of multiple components, a third party trading partner, a shipper, a carrier, a sub-carrier, a trading partner, a type of trading partner and other qualitative constraints, the plurality of temporal constraints selected from the group consisting of a time required for a pickup, a time required for a delivery, a time for an appointment, storage availability, loading point availability, product availability, business hours, staff availability, time required for completing tasks, distribution of time required for completing tasks, operating times, a time, appointment times, potential appointment timeframes, fixed time calculation, potential appointment timeframes spanning at least one day, potential appointment timeframes spanning at least two days, loading point hours of operation, block time, availability of goods, previous appointments, intervals, fixed durations, variable durations, reservations, negative reservations, release times, times, preferences, subcarrier release times, frozen time, subcarrier frozen times, timeframes, a generated temporal constraint from the computing system, pick-up time, drop-off time, a timeslot, a freeze of appointments and other temporal constraints; and process the plurality of constraints, by a processor of a message translation system, into a format for use with the computing system; and a combination engine configured to perform the steps of:
(a) receiving a plurality of constraints on the plurality of resources, wherein the plurality of constraints includes a plurality of temporal constraints and a plurality of qualitative constraints;

(b) expanding a first qualitative constraint of the plurality of qualitative constraints into a first expanded temporal constraint on a first resource of the plurality of resources meeting a quality level associated with the first qualitative constraint;

(c) translating the plurality of temporal constraints and the first expanded temporal constraint into sets of binary temporal constraints;

(d) combining each of the sets of the binary temporal constraints into a plurality of single binary temporal constraints, wherein combining each of the sets of the binary temporal constraints includes applying one or more bit-wise Boolean operations to the sets of binary temporal constraints;

(e) combining the plurality of single binary temporal constraints into an overall binary temporal schedule, wherein combining the plurality of single binary temporal constraints includes applying one or more bit-wise Boolean operations to the plurality of single binary temporal constraints; and (f) translating the overall binary temporal schedule into a non-binary temporal schedule; and a display device configured to display to a user, a viable schedule from the non-binary temporal schedule, wherein the combination engine is configured to perform a subsequent run of steps (a)-(f) independent of a previous run of steps (a)-(f) without knowledge of the previous run.

12. The system of claim 11, wherein steps (d) and (e) include applying one or more bit-wise AND operations to the sets of the binary temporal constraints and the plurality of single binary temporal constraints.

13. The system of claim 11, wherein steps (d) and (e) include applying one or more bit-wise OR operations to the sets of the binary temporal constraints and the plurality of single binary temporal constraints.

14. The system of claim 11, wherein the combination engine has specialized hardware including a message queue, a master data portion, a validation state, a filter, a map and a reduction stage, the combination engine configured for performing high volumes of computations tasks utilizing thousands of interrelated constraints of the plurality of constraints.

* * * * *